US 7,668,761 B2

(12) United States Patent
Jenkins et al.

(10) Patent No.: US 7,668,761 B2
(45) Date of Patent: Feb. 23, 2010

(54) SYSTEM AND METHOD FOR ENSURING ORDER FULFILLMENT

(75) Inventors: Joseph A. Jenkins, Arlington, VA (US); Phoebe Hsiang, Rockville, MD (US); Rosalie Seaman, Montgomery Village, MD (US); Boina Kanth, Fairfax, VA (US); Grace Bestland, Gaithersburg, MD (US)

(73) Assignee: JDA Software Group, Scottsdale, AZ (US)

( * ) Notice: Subject to any disclaimer, the term of this patent is extended or adjusted under 35 U.S.C. 154(b) by 1440 days.

(21) Appl. No.: 09/984,349

(22) Filed: Oct. 29, 2001

(65) Prior Publication Data
US 2002/0188499 A1 Dec. 12, 2002

Related U.S. Application Data

(60) Provisional application No. 60/243,427, filed on Oct. 27, 2000.

(51) Int. Cl.
*G06Q 40/00* (2006.01)
(52) U.S. Cl. ...................................................... 705/28
(58) Field of Classification Search ..................... 705/8, 705/26, 28
See application file for complete search history.

(56) References Cited

U.S. PATENT DOCUMENTS

| 4,412,287 A | 10/1983 | Braddock, III |
| 4,509,123 A | 4/1985 | Vereen |
| 4,554,446 A | 11/1985 | Murphy |
| 4,636,950 A | 1/1987 | Caswell et al. |
| 4,674,044 A | 6/1987 | Kalmus et al. |
| 4,744,028 A | 5/1988 | Karmarkar |
| 4,887,077 A | 12/1989 | Irby et al. |
| 4,887,206 A | 12/1989 | Natarajan |
| 4,887,208 A | 12/1989 | Schneider et al. |
| 4,937,743 A | 6/1990 | Rassman et al. |

(Continued)

FOREIGN PATENT DOCUMENTS

| JP | 2000085925 A | 3/2000 |
| WO | WO 98/08177 | 2/1998 |
| WO | WO 00/48054 | 8/2000 |
| WO | WO 02/35393 | 2/2002 |

OTHER PUBLICATIONS

Goyal et al.: Recent Trend in modeling of deteriorating Inventory, 2001, European Journal of Operational Research, Elsevier, pp. 1-16.*

(Continued)

*Primary Examiner*—Hani Kazimi
*Assistant Examiner*—Bijendra K Shrestha
(74) *Attorney, Agent, or Firm*—Sheridan Ross P.C.

(57) ABSTRACT

The present invention provides a system and method whereby companies can optimally resolve the conflicts with respect to product availability. Embodiments of the invention allow users to search for product availability throughout its entire supply chain network to address conflicts as they arise. In particular, the present invention creates time-phased inventory plans that meet customer requirements while minimizing inventory and maximizing profit by ensuring that a company is carrying the right inventory at the right locations. Using the present invention, companies can orchestrate the time-phased storage and flow of a given product's supply to match demand by creating an optimal inventory strategy that includes deployment plans, master production schedules, and procurement requirements.

18 Claims, 2 Drawing Sheets

U.S. PATENT DOCUMENTS

| | | |
|---|---|---|
| 4,956,769 A | 9/1990 | Smith |
| 5,056,017 A | 10/1991 | McGarvey |
| 5,091,713 A | 2/1992 | Horne et al. |
| 5,128,861 A | 7/1992 | Kagami et al. |
| 5,148,365 A | 9/1992 | Dembo |
| 5,168,445 A | 12/1992 | Kawashima et al. |
| 5,193,065 A | 3/1993 | Guerindon et al. |
| 5,231,567 A | 7/1993 | Matoba et al. ............... 364/401 |
| 5,233,533 A | 8/1993 | Edstrom et al. ............. 364/468 |
| 5,237,495 A | 8/1993 | Morii |
| 5,237,497 A | 8/1993 | Sitarski |
| 5,270,921 A | 12/1993 | Hornick |
| 5,283,856 A | 2/1994 | Gross et al. |
| 5,287,267 A | 2/1994 | Jayaraman et al. |
| 5,299,115 A | 3/1994 | Fields et al. |
| 5,369,570 A | 11/1994 | Parad |
| 5,383,112 A | 1/1995 | Clark |
| 5,446,890 A | 8/1995 | Renslo et al. |
| 5,459,656 A | 10/1995 | Fields et al. |
| 5,463,555 A | 10/1995 | Ward et al. .................. 364/468 |
| 5,467,285 A | 11/1995 | Flinn et al. |
| 5,487,134 A | 1/1996 | Ballard |
| 5,526,944 A | 6/1996 | Merl |
| 5,546,576 A | 8/1996 | Cochrane et al. ............. 395/600 |
| 5,568,489 A | 10/1996 | Yien et al. |
| 5,576,951 A | 11/1996 | Lockwood |
| 5,581,461 A | 12/1996 | Coll et al. |
| 5,586,025 A | 12/1996 | Tsuji et al. |
| 5,615,109 A | 3/1997 | Eder |
| 5,630,070 A | 5/1997 | Dietrich et al. |
| 5,644,725 A | 7/1997 | Schmerer |
| 5,657,453 A | 8/1997 | Taoka et al. |
| 5,699,526 A | 12/1997 | Siefert et al. |
| 5,701,400 A | 12/1997 | Amado |
| 5,712,985 A | 1/1998 | Lee et al. |
| 5,712,989 A | 1/1998 | Johnson et al. |
| 5,715,393 A | 2/1998 | Naugle |
| 5,720,157 A | 2/1998 | Ross |
| 5,724,577 A | 3/1998 | Exley et al. |
| 5,727,164 A | 3/1998 | Kaye et al. |
| 5,727,165 A | 3/1998 | Ordish et al. |
| 5,740,425 A | 4/1998 | Povilus |
| 5,764,509 A | 6/1998 | Gross et al. |
| 5,764,543 A | 6/1998 | Kennedy |
| 5,765,138 A | 6/1998 | Aycock et al. |
| 5,765,143 A | 6/1998 | Sheldon et al. |
| 5,771,172 A | 6/1998 | Yamamoto et al. |
| H1743 H | 8/1998 | Graves et al. |
| 5,790,536 A | 8/1998 | Mahany et al. |
| 5,794,210 A | 8/1998 | Goldhaber et al. |
| 5,794,219 A | 8/1998 | Brown et al. |
| 5,802,253 A | 9/1998 | Gross et al. |
| 5,808,891 A | 9/1998 | Lee et al. |
| 5,809,479 A | 9/1998 | Martin et al. |
| 5,812,130 A | 9/1998 | Van Huben et al. |
| 5,815,638 A | 9/1998 | Lenz et al. |
| 5,818,336 A | 10/1998 | Varga et al. |
| 5,819,232 A * | 10/1998 | Shipman ........................ 705/8 |
| 5,823,948 A | 10/1998 | Ross et al. |
| 5,826,244 A | 10/1998 | Huberman |
| 5,835,377 A | 11/1998 | Bush |
| 5,835,716 A | 11/1998 | Hunt et al. |
| 5,835,896 A | 11/1998 | Fisher et al. |
| 5,870,724 A | 2/1999 | Lawlor et al. |
| 5,878,401 A | 3/1999 | Joseph |
| 5,884,300 A | 3/1999 | Brockman |
| 5,890,138 A | 3/1999 | Godin et al. |
| 5,897,624 A | 4/1999 | Ramaswamy |
| 5,905,975 A | 5/1999 | Ausubel |
| 5,913,202 A | 6/1999 | Motoyama |
| 5,914,878 A | 6/1999 | Yamamoto et al. |
| 5,915,209 A | 6/1999 | Lawrence |
| 5,918,213 A | 6/1999 | Bernard et al. |
| 5,930,156 A | 7/1999 | Kennedy |
| 5,930,771 A | 7/1999 | Stapp |
| 5,931,900 A | 8/1999 | Notani et al. |
| 5,933,813 A | 8/1999 | Teicher et al. |
| 5,937,037 A | 8/1999 | Kamel et al. |
| 5,940,807 A | 8/1999 | Purcell |
| 5,946,662 A | 8/1999 | Ettl et al. ........................ 705/8 |
| 5,950,173 A | 9/1999 | Perkowski |
| 5,953,707 A | 9/1999 | Huang et al. |
| 5,960,408 A | 9/1999 | Martin et al. |
| 5,961,651 A | 10/1999 | Gittins et al. |
| 5,962,834 A | 10/1999 | Markman |
| 5,963,134 A | 10/1999 | Bowers et al. |
| 5,963,918 A | 10/1999 | Reagan et al. |
| 5,963,919 A | 10/1999 | Brinkley et al. |
| 5,963,920 A | 10/1999 | Rose et al. |
| 5,964,837 A | 10/1999 | Chao et al. |
| 5,966,699 A | 10/1999 | Zandi |
| 5,970,465 A | 10/1999 | Dietrich et al. |
| 5,970,475 A | 10/1999 | Barnes et al. |
| 5,974,395 A | 10/1999 | Bellini et al. .................. 705/6 |
| 5,974,460 A | 10/1999 | Maddalozzo, Jr. et al. |
| 5,983,194 A | 11/1999 | Hogge et al. |
| 5,983,195 A | 11/1999 | Fierro |
| 5,983,202 A | 11/1999 | Yabe et al. |
| 5,995,945 A | 11/1999 | Notani et al. |
| 6,006,192 A | 12/1999 | Cheng et al. |
| 6,006,196 A | 12/1999 | Feigin et al. |
| 6,006,201 A | 12/1999 | Berent et al. |
| 6,009,406 A | 12/1999 | Nick |
| 6,009,407 A | 12/1999 | Garg |
| 6,012,041 A | 1/2000 | Brewer et al. |
| 6,012,045 A | 1/2000 | Barzilai et al. |
| 6,021,396 A | 2/2000 | Ramswamy et al. |
| 6,021,398 A | 2/2000 | Ausubel |
| 6,023,683 A | 2/2000 | Johnson et al. |
| 6,023,685 A | 2/2000 | Brett et al. |
| 6,023,686 A | 2/2000 | Brown |
| 6,026,372 A | 2/2000 | Savage |
| 6,026,383 A | 2/2000 | Ausubel |
| 6,029,140 A | 2/2000 | Martin et al. |
| 6,029,143 A | 2/2000 | Mosher et al. |
| 6,032,125 A | 2/2000 | Ando |
| 6,035,284 A | 3/2000 | Straub |
| 6,035,288 A | 3/2000 | Solomon |
| 6,035,289 A | 3/2000 | Chou et al. |
| 6,038,542 A | 3/2000 | Ruckdashel |
| 6,041,267 A | 3/2000 | Dangat et al. |
| 6,044,354 A | 3/2000 | Asplen, Jr. |
| 6,044,363 A | 3/2000 | Mori et al. |
| 6,047,264 A | 4/2000 | Fisher et al. |
| 6,047,274 A | 4/2000 | Johnson et al. |
| 6,049,742 A | 4/2000 | Milne et al. |
| 6,049,781 A | 4/2000 | Forrest et al. |
| 6,055,505 A | 4/2000 | Elston |
| 6,055,516 A | 4/2000 | Johnson et al. |
| 6,055,518 A | 4/2000 | Franklin et al. |
| 6,058,379 A | 5/2000 | Odom et al. |
| 6,061,691 A | 5/2000 | Fox |
| 6,064,967 A | 5/2000 | Speicher |
| 6,064,981 A | 5/2000 | Barni et al. |
| 6,070,148 A | 5/2000 | Mori et al. |
| 6,073,107 A | 6/2000 | Minkiewicz et al. |
| 6,076,071 A | 6/2000 | Freeny, Jr. |
| 6,078,893 A | 6/2000 | Ouimet et al. |
| 6,078,900 A | 6/2000 | Ettl et al. |
| 6,078,906 A | 6/2000 | Huberman |
| 6,081,789 A | 6/2000 | Purcell |
| 6,085,173 A | 7/2000 | Suh |
| 6,086,619 A | 7/2000 | Hausman et al. |
| 6,088,681 A | 7/2000 | Coleman et al. |

| | | |
|---|---|---|
| 6,094,641 A | 7/2000 | Ouimet et al. |
| 6,101,479 A | 8/2000 | Shaw |
| 6,101,484 A | 8/2000 | Halbert et al. |
| 6,105,004 A | 8/2000 | Halperin |
| 6,115,642 A | 9/2000 | Brown et al. |
| 6,119,101 A | 9/2000 | Peckover |
| 6,131,087 A | 10/2000 | Luke et al. |
| 6,134,534 A | 10/2000 | Walker et al. |
| 6,134,549 A | 10/2000 | Regnier et al. |
| 6,138,103 A | 10/2000 | Cheng et al. |
| 6,148,291 A | 11/2000 | Radican |
| 6,151,582 A * | 11/2000 | Huang et al. .................. 705/8 |
| 6,151,589 A | 11/2000 | Aggarwal et al. |
| 6,157,915 A | 12/2000 | Bhaskaran et al. |
| 6,161,099 A | 12/2000 | Harrington et al. |
| 6,167,380 A | 12/2000 | Kennedy et al. |
| 6,167,385 A | 12/2000 | Hartley-Urquhart |
| 6,167,386 A | 12/2000 | Brown |
| 6,173,210 B1 | 1/2001 | Bjornson et al. |
| 6,188,989 B1 * | 2/2001 | Kennedy ...................... 705/8 |
| 6,198,980 B1 | 3/2001 | Costanza |
| 6,199,050 B1 | 3/2001 | Alaia et al. |
| 6,202,051 B1 | 3/2001 | Woolston |
| 6,205,431 B1 | 3/2001 | Willemain et al. |
| 6,216,109 B1 | 4/2001 | Zweben et al. |
| 6,216,114 B1 | 4/2001 | Alaia et al. |
| 6,219,649 B1 | 4/2001 | Jameson |
| 6,219,653 B1 | 4/2001 | O'Neill |
| 6,233,493 B1 | 5/2001 | Cherneff et al. |
| 6,243,493 B1 | 6/2001 | Brown et al. |
| 6,272,389 B1 | 8/2001 | Dietrich |
| 6,289,384 B1 | 9/2001 | Whipple et al. |
| 6,289,462 B1 | 9/2001 | McNabb et al. |
| 6,301,621 B1 | 10/2001 | Haverstock et al. |
| 6,308,107 B1 | 10/2001 | Conboy et al. |
| 6,341,271 B1 * | 1/2002 | Salvo et al. ................... 705/28 |
| 6,393,332 B1 * | 5/2002 | Gleditsch et al. .............. 700/99 |
| 6,397,221 B1 | 5/2002 | Greef et al. |
| 6,415,196 B1 | 7/2002 | Crampton et al. |
| 6,415,259 B1 * | 7/2002 | Wolfinger et al. .............. 705/8 |
| 6,477,660 B1 | 11/2002 | Shoner |
| 6,574,619 B1 | 6/2003 | Reddy et al. |
| 6,587,827 B1 * | 7/2003 | Hennig et al. .................. 705/1 |
| 6,591,153 B2 | 7/2003 | Crampton et al. |
| 6,601,234 B1 | 7/2003 | Bowman-Amuah |
| 6,609,101 B1 | 8/2003 | Landvater |
| 6,611,726 B1 | 8/2003 | Crosswhite |
| 6,622,127 B1 * | 9/2003 | Klots et al. .................... 705/28 |
| 6,625,616 B1 | 9/2003 | Dragon et al. |
| 6,684,193 B1 | 1/2004 | Chavez et al. |
| 6,704,714 B1 | 3/2004 | O'Leary et al. |
| 6,745,150 B1 | 6/2004 | Breiman |
| 6,754,666 B1 | 6/2004 | Brookler et al. |
| 6,804,657 B1 | 10/2004 | Sultan |
| 6,816,839 B1 | 11/2004 | Gung et al. |
| 6,850,809 B1 * | 2/2005 | Callar et al. ................... 700/96 |
| 6,850,895 B2 | 2/2005 | Brodersen et al. |
| 6,898,475 B1 | 5/2005 | Ruml et al. |
| 6,901,448 B2 | 5/2005 | Zhu et al. |
| 6,963,847 B1 * | 11/2005 | Kennedy et al. ............... 705/8 |
| 6,970,837 B1 | 11/2005 | Walker et al. |
| 6,996,502 B2 | 2/2006 | De La Cruz et al. |
| 6,996,538 B2 | 2/2006 | Lucas |
| 7,058,587 B1 | 6/2006 | Horne |
| 7,069,235 B1 * | 6/2006 | Postelnik et al. .............. 705/26 |
| 7,080,026 B2 | 7/2006 | Singh |
| 7,177,825 B1 * | 2/2007 | Borders et al. ................ 705/26 |
| 7,403,975 B2 | 7/2008 | Berkery et al. |
| 2001/0027418 A1 * | 10/2001 | Johnson ........................ 705/22 |
| 2001/0039514 A1 * | 11/2001 | Barenbaum et al. ........... 705/14 |
| 2002/0013721 A1 | 1/2002 | Dabbiere et al. |
| 2002/0019759 A1 | 2/2002 | Arunapuram |
| 2002/0019761 A1 | 2/2002 | Lidow |
| 2002/0042755 A1 | 4/2002 | Kumar et al. |
| 2002/0049622 A1 | 4/2002 | Lettich et al. |
| 2002/0049625 A1 | 4/2002 | Kilambi et al. |
| 2002/0095307 A1 | 7/2002 | Greamo et al. |
| 2002/0133387 A1 | 9/2002 | Wilson et al. |
| 2002/0156663 A1 | 10/2002 | Weber |
| 2002/0188499 A1 | 12/2002 | Jenkins et al. |
| 2002/0198616 A1 | 12/2002 | Crampton |
| 2003/0033180 A1 | 2/2003 | Shekar et al. |
| 2004/0205074 A1 | 10/2004 | Berkery |
| 2005/0131919 A1 | 6/2005 | Brookler et al. |
| 2007/0174144 A1 | 7/2007 | Borders et al. |

OTHER PUBLICATIONS

Keilson et al.: Product Selection Policies for Perishable Inventory Systems, Aug. 1990, http://dspace.mit.edu/bitstream/handle/1721.1/5372/OR-226-90.pdf?sequence=2.*

Aguigam, A.: Inventory Management of Phamaceuticals in Authorized Medicals / Dental Allowance Lists, Master Thesis, Dec. 1991, Naval Postgraduate School, Monterey, California, pp. 1-96.*

Official Action for U.S. Appl. No. 09/882,257, mailed Nov. 29, 2004, pp. 1-16.

Official Action for U.S. Appl. No. 09/882,257, mailed Mar. 18, 2004, pp. 1-12.

Official Action for U.S. Appl. No. 09/903,855, mailed Jul. 12, 2005, pp. 1-40.

International Search Report for PCT/US01/42796, dated Mar. 25, 2002, pp. 1-3.

International Preliminary Examination Report for PCT/US01/42796, received Jan. 14, 2003, pp. 1-3.

Notice of Allowability for U.S. Appl. No. 10/704,141, mailed Feb. 28, 2008, pp. 1-10.

Notice of Allowance for U.S. Appl. No. 10/704,141, mailed Jan. 16, 2008, pp. 1-3.

Official Action for U.S. Appl. No. 10/704,141, Jul. 17, 2007, pp. 1-9.

Notice of Allowance for U.S. Appl. No. 09/984,347, mailed Feb. 23, 2006, pp. 1-3.

Notice of Allowability for U.S. Appl. No. 09/984,347, mailed Dec. 20, 2005, pp. 1-5.

Official Action for U.S. Appl. No. 09/984,347, mailed Dec. 7, 2005, pp. 1-10.

Notice of Allowance for U.S. Appl. No. 10/057,983, mailed Jan. 9, 2006, pp. 1-3.

Notice of Allowability for U.S. Appl. No. 10/057,983, mailed Jan. 9, 2006, pp. 1-6.

Official Action for U.S. Appl. No. 10/057,983, mailed Apr. 6, 2005, pp. 1-5.

Official Action for U.S. Appl. No. 10/057,983, mailed Oct. 12, 2004, pp. 1-4.

Official Action for U.S. Appl. No. 10/057,983, mailed May 21, 2003, pp. 1-10.

Official Action for U.S. Appl. No. 10/057,983, mailed Oct. 28, 2003, pp. 1-8.

Official Action for U.S. Appl. No. 09/984,346, mailed Oct. 9, 2007, pp. 1-14.

Official Action for U.S. Appl. No. 09/984,346, mailed Apr. 3, 2007, pp. 1-11.

Official Action for U.S. Appl. No. 09/984,350, mailed May 12, 2005, pp. 1-10.

International Search Report for International Application PCT/US01/42824, mailed Jan. 29, 2002, p. 1.

International Search Report, International Application No. PCT/US02/02371, mailed Sep. 17, 2002, pp. 1-3.

"Thru-Put Corporation Delivers e-Business Version of Supply Chain Planning Solution" Mapics, Inc. Press release, Sep. 1, 2000, [retrieved on Jun. 15, 2002], Retrieved from the Internet: http://findarticles.com/p/articles/mi_m0EIN/is_2000_Sept_1/pg_3?opg=64992295&pnum=3&tag=artBody;col1.

S.C. Feng, "Manufacturing Planning and Execution Software Interfaces" Journal of Manufacturing Systems, vol. 19, No. 1, 2000.

NTE, Inc., http: www.nte.com/Default.asp (downloaded Oct. 10, 2001), p. 1.

NTE, Inc., http: www.nte.com/exchange/default.asp (downloaded Oct. 10, 2001), p. 1.
NTE, Inc. http: www.nte.com/exchange/exchangeinfo_works.asp (downloaded Oct. 10, 2001), p. 1.
NTE, Inc., http: www.nte.com/exchange/exchangeinfo_feat.asp (downloaded Oct. 10, 2001), p. 1.
Smith, Stephen A., "Management of Multi-Item Retail Inventory Systems with Demand Substitution", Operation Research, Jan./Feb. 2000, pp. 50-64.
Dick, R., Yellow Fine Tunes Web Site with Custom Rate Quotes, News Release, Yellowfreight.com, Jan. 2000, pp. 1-2.
Hefflin, Deborah; Harrell, Charles; "Simulation Modeling and Optimization using ProModel", 1998, Proceedings of the 1998 Winter Simulation Conference, pp. 191-197.
Benson, Deborah, "Simulation Modeling and Optimization using ProModel", 1997, Proceedings of the 1997 Winter Simulation Conference, pp. 587-593.
Erkut, Erhan; Oezen, Uemit; "Aggregate Planning for Distribution of Durable Household Products: A Case Study", 1996, Journal of Business Logistics, 17, 2; ABI/INFORM Global, pp. 217-234.
Thierauf, Robert J.; Klekamp, Robert C; "Decision Making through Operations Research", 2nd Edition, copyright 1975, pp. 157-207, 521-537.
Web.archive.org, ProModel.com webpage of Dec. 1, 1998, "Variable Resource Movement", pp. 1-2.
Brock Engineering White Paper, "Combined Simulation Models in ProModel", www.brockeng.com/wsc95/wsc95doc.htm, pp. 1-9.
web.archive.org, ProModel.com webpage of Jul. 13, 1997, "Link-Belt Testimonial", p. 1.
Vacca, John, "Faking it, then Making it", Jul. 12, 1997, byte.com, pp. 1-7, web.archive.org/web/19970712122641/www.byte.com/art/9511/sec5/art7.htm.
Michel, Roberto, "Whatever it takes", Jul. 1997, Manufacturing Systems, v15n7, pp. 1-16, Dialog 01493157 01-44145.
Senko, James M; Suskind, Peter B, "Proper Planning and Simulation Play a Major Role in Proper Warehouse Design", Jun. 1990, Industrial Engineering, v22n6, p. 1, Dialog 00502785 90-28542.
Lindo webpages archived from Apr. 1999, Lindo.com, "Lindo Systems", pp. 1-3.
Lindo webpages archived from Dec. 1998, Lindo.com, "Lindo Systems", pp. 1-6.
Akbay, Kunter S, "Using simulation optimization to find the best solutions", IIE Solutions; May 1996; 28; 5; ABI/INFORM Global, p. 24-29.
Van Buer, Michael G; Venta, Enrique R.; Zydiak, James L "Heuristic Approaches to Purchasing Bundles of Multiple Products From Multiple Vendors", Journal of Business Logistics, 1997; 18, 1; ABI/INFORM Global, p. 125-140.
Kennedy, Kristin T; Quinn, John T; "Multiple Sourcing Alternatives Using Nearly Optimal Programming", Journal of Education for Business, Mar./Apr. 1998; 73,4; ABI/INFORM Global, p. 206-210.
Rubin, Paul; "Heuristic Solution Procedures for a Mixed-Integer Programming Discriminant Model", Managerial and Decision Economics (1986-1998); Oct. 1990; 11, 4; ABI/INFORM Global, p. 255-266.
Tate, David M; Smith, Alice E; "Unequal -area facility layout by generic search", Aug. 1995, IIE Transactions, v27, n4, pp. 1-11, Dialog 08156348 17474055.
Murphy, Frederick; Panchanadam, Venkat; "Understanding Linear Programming Modeling Through an Examination of the Early Papers on Model Formulation", May/Jun. 1997, Operations Research; 45, 3; ABI/INFORM Global, p. 341-356.
Al-shammari, Minwir; Dawood, Isaam; "Linear Programming Applied to a Production Blending Problem: A spreadsheet modeling approach", First Qarter 1997, Production and Inventory Management Journal, 38; 1; ABI/INFORM Global, p. 1-7.
Al-Harbi, Kamal Al-Subhi; Selim, Shokri Z; Al-sinan, Mazen, Dec. 1996, "A Multiobjective Linear Program for Scheduling Repetitive Projects", Cost Engineering, 38, 12; ABI/INFORM Global, p. 41-45.
Denney, Steve H; "MedModel—Healthcare Simulation Software", 1997, Proceedings of the 1997 Winter Simulation Software, pp. 581-586.

Nembhard, Harriet Black; Kao, Ming-Shu; Lim, Gino; "Integrating Discrete-Event Simulation with Statistical Process Control Charts for Transitions in a Manufacturing Environment", 1999 Proceedings of the 1999 Winter Simulation Software, pp. 701-708.
Gladwin, Bruce D.; Harrell, Charles R.; "Introduction to ProcessModel and ProcessModel 9000", 1997, Proceedings of the 1997 Winter Simulation Software, pp. 594-600.
Crampton, U.S. Appl. No. 60/056,243, filed Aug. 28, 1997.
Arunapuram, U.S. Appl. No. 60/212,124, filed Jun. 16, 2000.
Weber, U.S. Appl. No. 60/218,640, filed Jul. 13, 2000.
Crampton, U.S. Appl. No. 60/239,280, filed Oct. 12, 2000.
Keller, U.S. Appl. No. 60/243,400, filed Oct. 27, 2000.
Cluff, U.S. Appl. No. 60/243,425, filed Oct. 27, 2000.
Horne, U.S. Appl. No. 60/264,321, filed Jan. 29, 2001.
Dick, R., Yellow Now Open for 'E business', News Release, Yellowfreight.com, Mar. 1999, pp. 1-2.
PRNewswire, Wal-Mart Streamlines Transportation Bidding Process with The Sabre Group's Decision Support Software, Dialog, File 813, Document #1330249, Aug. 1998, pp. 1-2.
Price, Rochelle N.; Harrell, Charles R.; "Healthcare Simulation Modeling and Optimization using MedModel", 1997, Proceedings of the 1997 Winter Simulation Software, pp. 215-219.
Whitman, Larry; Huff, Brian; Palaniswamy, Senthil; "Commercial Simulation over the Web", 1998, Proceedings of the 1998 Winter Simulation Software, pp. 335-339.
Schriber, Thomas J; Brunner, Daniel T; Inside Discrete-Event Simulation Software: How it works and Why it matters:, 1997 Proceedings of the 1997 Winter Simulation Software, pp. 14-22.
Czarnecki, Hank; Schroer, Bernard J; Rahman, M. Mizzanur; "Using Simulation to Schedule Manufacturing Resources", 1997, Proceedings of the 1997 Winter Simulation Software, pp. 750-757.
Swedish, Julian A; "Simulation of an Inland Waterway Barge Fleet Distribution Network", 1998, Proceedings of the 1998 Winter Simulation Software, pp. 1219-1221.
Jenkins, Roger; Deshpande, Yogesh; Davison, Graydon; "Verification and Validation and Complex Environments: A Study in the Service Sector", 1998, Proceedings of the 1998 Winter Simulation Software, pp. 1433-1440.
Swersey, Arthur J.; Ballard, Wilson; "Scheduling School Buses", Jul. 1984, Management Science, 30, 7, ABI/INFORM Global, p. 844-853.
Billington, Peter J.; McClain, John O.; Thomas, L. Joseph; "Heuristics for Multilevel Lot-sizing with a Bottleneck", Aug. 1986, Management Science, 32, 8, ABI/INFORM Global, p. 989-1006.
web.archive.org, Caps.com, "Caps-Logistics Home Page", Jan. 7, 1997, pp. 1-2, http://web.archive.org/web/19970107055024/http://www.caps.com/.
web.archive.org, Caps.com, "Caps Logistics Supply Chain Designer—Supply Chain Management Solutions", Feb. 6, 1998, pp. 1-2, http://web.archive.org/web/19980206195329/http://www.caps.com/.
web.archive.org, caps.com, "Optimization Power", Feb. 6, 1998, p. 1, http://web.archive.org/web/19980206200627/www.caps.com/SCDesign/topics/optimi.htm.
web.archive.org, caps.com, "Supply Chain Data Input Template", Feb. 6, 1998, p. 1, http://web.archive.org/web/19980206200525/www.caps.com/screenpics/SCDesign/scdit.htm.
web.archive.org, caps.com, "International Screenshot", May 3, 1998, p. 1, http://web.archive.org/web/19980503062127/www.caps.com/screenpics/SCDesign/interntl.htm.
web.archive.org, Caps.com, "Supply Chain Case Study", Feb. 6, 1998, p. 1-2, http://web.archive.org/web/19980206200651/www.caps.com/SCDesign/topics/Supcase.htm.
Data Base Security/Authorization Mechanisms, IBM Technical Disclosure Bulletin, Aug. 1985, vol. 28, No. 3, pp. 1-6.
Mathur, Kamlesh and Solow, Daniel, "Management Science", 1994, Prentice Hall, pp. 49-55, 74-75, 80-87, 114-119, 126-127, 212-215, 244-251, 592-605, 610-611, 614-615, 618-619, 622-623, 626-627, 630, 636-642, 748-749, (2 additional).
Vollmann, Thomas E., Berry, William L., and Whybark, D. Clay, "Manufacturing Planning and Control Systems", 1997, Irwin/McGraw Hill, pp. 224-227, 236-237, 270-271, 612-613, 615-616, 622-623, 628-629.

A.J. Kaplan, "Bayesian Approach to Inventory Control of New Parts", IIE Transactions, vol. 20, No. 2, Jun. 1998, pp. 151-156.

Harrington, "Collaborating on the Net," Transportation & Distribution, Feb. 2000, vol. 41, No. 2, pp. D8-D12.

"Manugistics Delivers Intelligent Decision Making for eBusiness Trading Networks", ProQuest website—PR Newswire, Dec. 14, 1999, available at http://proquest.umi.com/pdqweb?index=4&did=47208965&SrchMode=2&sid=8&Fmt=3..., printed on Dec. 16, 2008, pp. 1-3.

Official Action for U.S. Appl. No. 09/984,346, mailed Dec. 23, 2008, pp. 1-27.

Notice of Abandonment for U.S. Appl. No. 09/984,346, mailed Jul. 17, 2009, pp. 1-2.

webarchive.com for consumergoods.com, "CPFR Pace Picks Up" by Mark Frantz, Jan./Feb. 1999.

"Troubled Manugistics is not for sale", Manufacturing Computer Solutions, Feb. 1999, vol. 5, issue 2.

Holt, Stephanie, "Manugistics to extend supply chain Web", InfoWorld, Sep. 22, 1997, vol. 19, issue 38.

Gray, Lloyd, "Manugistics makes link to supply chains", PC Week, v14, Sep. 8, 1997.

"Manugistics Demonstrates World-Class Manufacturing Solutions at APICS '97", PR Newswire, Oct. 27, 1997.

"New Solutions for Internet-Based Supply Chain Collaboration Introduced in Manugistics NetWorks", PR Newswire, Sep. 21, 1998.

Harrington, Lisa, "Software tools to revamp your supply chain", Tranportation & Distribution, v39, n11, Nov. 1998.

Oracle integrates Manugistics Networks supply chain solution into CPG Applications Suite, M2 Presswire (Coventry), May 7, 1998, p. 1.

Manugistics announces intelligent purchasing solution; Staples using solution to improve order visibility, M2 Presswire (Coventry), Aug. 23, 2000, p. 1.

Shekar, U.S. Appl. No. 60/424,708, filed Nov. 8, 2002.

Berkey, U.S. Appl. No. 60/477,050, filed Jun. 10, 2003.

Drolet, U.S. Appl. No. 60/236,379, filed Sep. 29, 2000, pp. 1-165.

Official Action for U.S. Appl. No. 09/965,854, mailed Nov. 7, 2005, pp. 1-12.

Official Action for U.S. Appl. No. 09/965,854, mailed Apr. 3, 2006, pp. 1-14.

Official Action for U.S. Appl. No. 09/965,854, mailed Dec. 29, 2006, pp. 1-11.

Official Action for U.S. Appl. No. 09/965,854, mailed Aug. 7, 2007, pp. 1-10.

Official Action for U.S. Appl. No. 09/965,854, mailed Jan. 10, 2008, pp. 1-14.

International Search Report for International Application PCT/US01/30370, mailed Jan. 11, 2002, p. 1.

* cited by examiner

SYSTEM AND METHOD FOR ENSURING ORDER FULFILLMENT

RELATED APPLICATIONS

This application claims priority from U.S. Provisional Application Ser. No. 60/243,427, filed Oct. 27, 2000, the disclosure of which is hereby incorporated by reference in its entirety.

FIELD OF THE INVENTION

Disclosed is a system and method for ensuring manufacturing order fulfillment. In particular, the present invention pertains to a system and method for responding to supply conflicts, such as unexpected delays in production, by rerouting and reapplying resources.

BACKGROUND OF THE INVENTION

It is typically advantageous for businesses to operate with relatively small inventory levels. Lower inventory levels allow businesses to minimize storage costs. Furthermore, lower inventory levels allow businesses to reduce risks from market changes such as fluctuating in price or demand.

To assist a business in maintaining lower inventory levels, it is known to provide accurate estimates of market supply and demand that are specific to the needs of that business. For instance, U.S. Provisional Application No. 60/264,321 and U.S. application Ser. No. 60/243,425 (incorporated herein by reference in their entirety) provide system methods to estimate, respectively, supply (planned arrival) and demand (planned orders) tallies for a business's products in particular markets. Given this estimated supply and demand information, a business may use scheduling tools such as U.S. application Ser. No. 09/974,801 and U.S. application Ser. No. 09/143,545 to coordinate the production/procurement of a good or service with the delivery of that good/service to clients. Similarly, given exact supply and demand data, a business may use a tool, such as U.S. Provisional Application No. 60/243,400, to coordinate this supply and demand. A business may further use tools such as these described in U.S. application Ser. Nos. 09/882,257 and 09/903,855 to organize on time low-cost shipments of orders. All of these references are hereby incorporated by reference in full.

Problems for business arise from unexpected changes in supply or demand. While the remainder of this application refers exclusively to increases in demand, it should be appreciated that the system and method described herein are equally applicable to unexpected decrease in supply. A typical example of an increase in demand is an unexpected order. In response to an unexpected order, a business may either reject that order, which is generally undesirable, or alter operations to meet the unexpected order. When a business chooses to alter its operations, the business then must select a least-cost strategy for satisfy the additional order while minimizing the effect on fulfillment of existing orders. An example of an unexpected decrease in supply is the loss of employees or the close of a factory, distribution center, or transportation lane. In response to an unexpected change in supply or demand, the business may need to adjust operations to meet existing order commitments.

Lack of distribution coordination and demand visibility results in excessive inventory costs, expedited shipments, decreased customer satisfaction, and lost revenues. A solution that orchestrates the flow and staging of inventory through a multi-echelon distribution network is an ideal answer for meeting customer service objectives while also minimizing inventory investment and logistics costs.

SUMMARY OF THE INVENTION

The present invention provides a system and method whereby companies can optimally resolve the conflicts with respect to product availability. Embodiments of the invention allow users to search for product availability throughout its entire supply chain network to address conflicts as they arise. It creates time-phased inventory plans that meet customer requirements while minimizing inventory and maximizing profit by ensuring that a company is carrying the right inventory at the right locations. Using the present invention, companies can orchestrate the time-phased storage and flow of a given product's supply to match demand by creating an optimal inventory strategy that includes deployment plans, master production schedules, and procurement requirements.

The present invention optimizes inventory and replenishment planning to create time-phased inventory plans that respect multiple time horizons (i.e., days, weeks, and months) and that recognize the interdependencies of the network on customer service and inventory investment. Warehouse space, shipping and receiving capacity, and customer delivery windows are all simultaneously considered, providing the user with real-time network visibility of planned shipments, in-transits, available inventory, and expiring product.

By dynamically searching for product availability throughout a company's network, the present invention minimizes lost revenue by ensuring customer requirements are met despite unanticipated delays in production, cross-border shipments, or transportation. In addition, through the use of user-controlled allocation strategies, the present invention ensures that in times of prolonged product shortage, customers continue to receive appropriate supply allocations. By launching proactive alerts to distribution planners when product replenishments are in danger of falling unexpectedly short, systems according to the present invention make it possible to avoid product shortages. Conversely, the present invention also alerts a user at the first sign of excess, obsolete, or expiring inventory. Through this early intervention process, "push" logic, and customer-specific date sensitivity tracking, potentially unusable inventory can be appropriately redeployed within the network.

The present invention decreases expediting and inventory costs, while maximizing customer service by orchestrating time-phased product/material flow; optimizing inventories across a multi-echelon network; providing networkwide visibility including customer/supplier locations; allocating critical goods during supply shortages; and creating optimal deployment, master production, and procurement plans.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PRESENT INVENTION

Figure 1A:
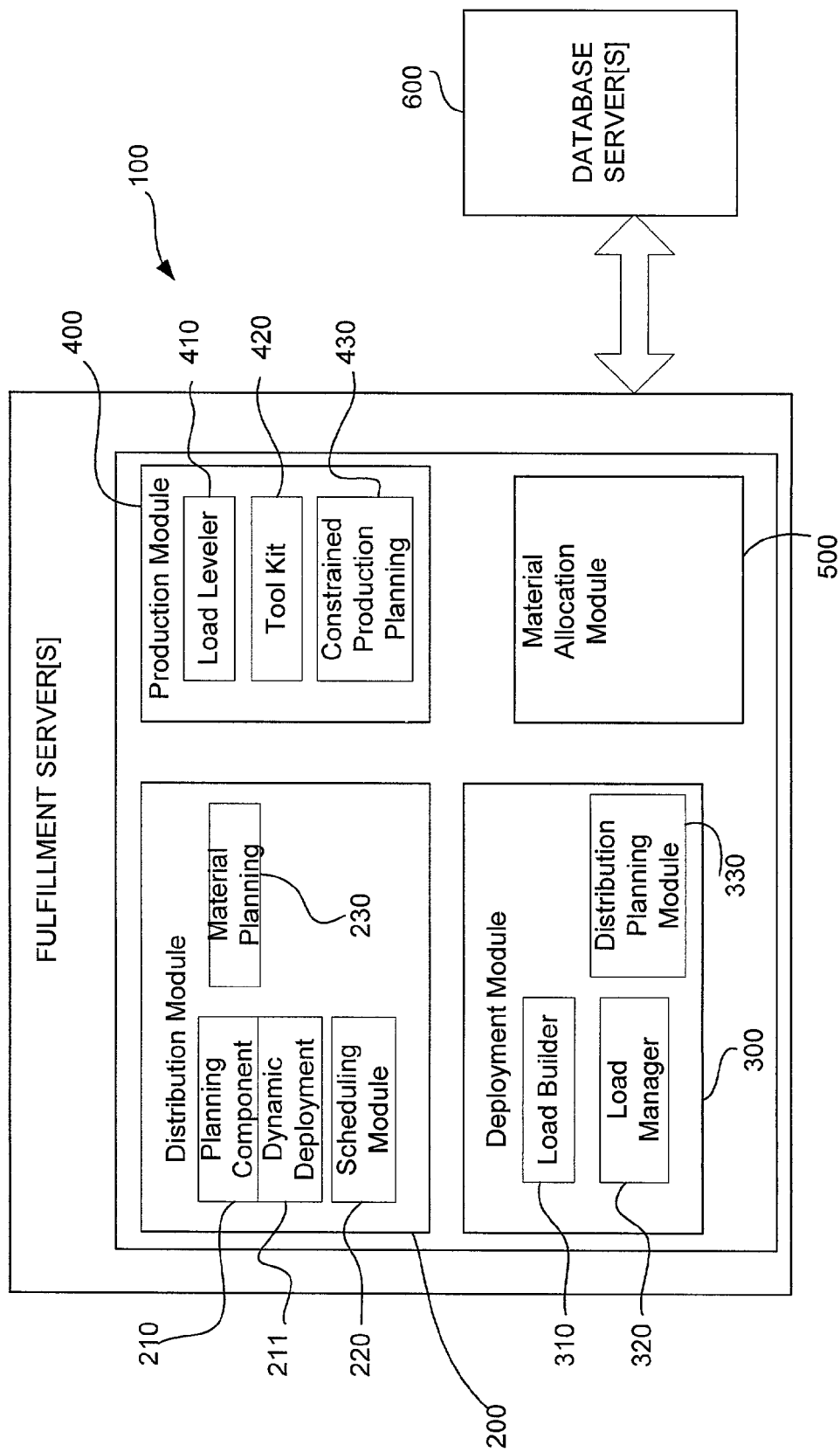
FIGS. 1A-1B illustrate block diagrams of a system for ensuring order fulfillment in accordance with embodiments of the present invention.
Figure 1B:
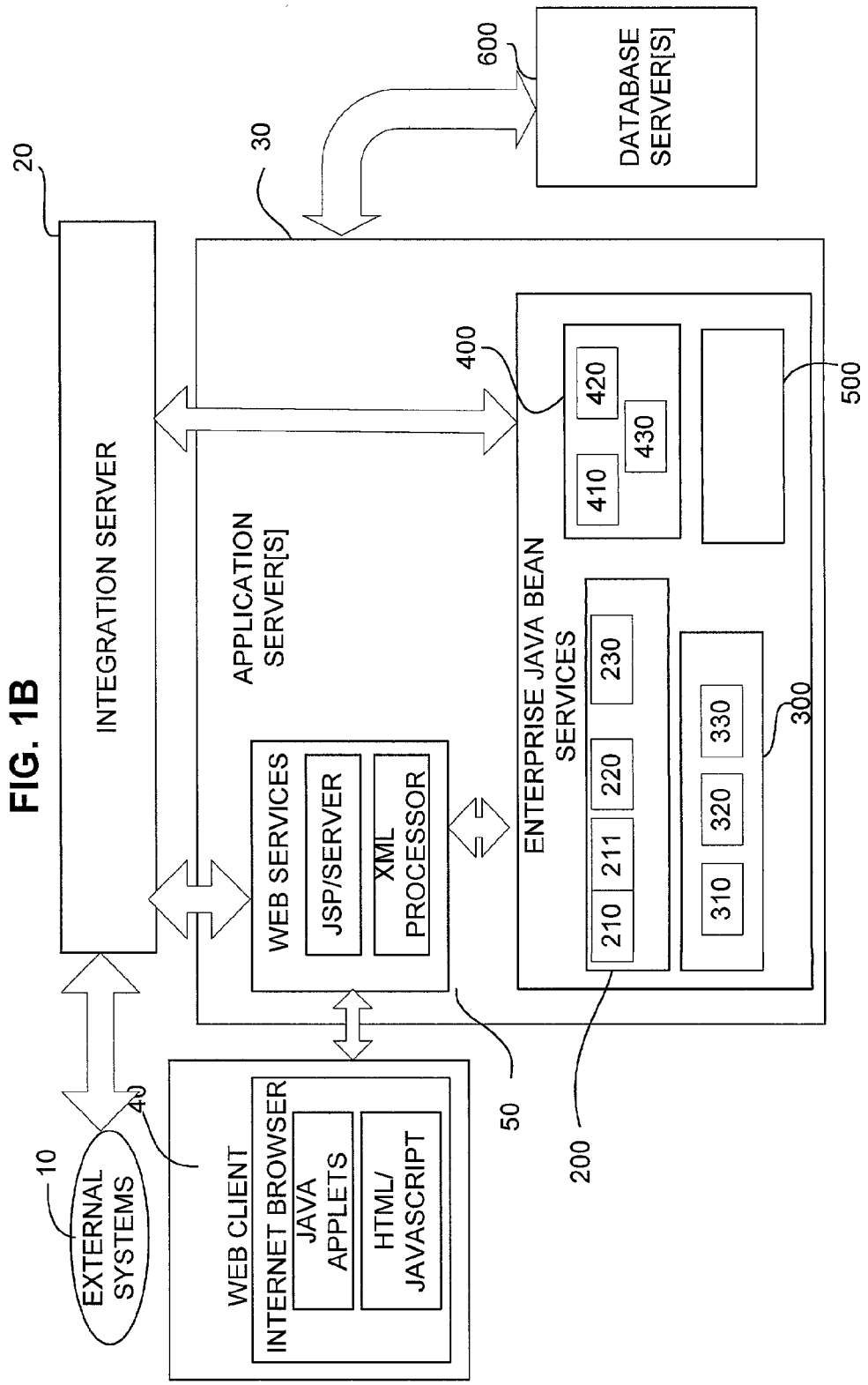

A fulfillment system 100, as illustrated in FIGS. 1A-1B, allows a user to orchestrate the time-phased storage and flow of supply to match demand by creating an optimal inventory strategy that includes deployment plans, master production schedules, and procurement requirements. Additionally, the user can provide end-to-end visibility, minimize inventory investment, and reduce logistics costs while the user minimizes customer service.

The fulfillment system 100 optimizes inventory and replenishment planning to create time-phased inventory plans that respect multiple time horizons such as days, weeks, and months and that recognize the interdependencies of the network on customer service and inventory investment. Warehouse space, shipping and receiving capacity, and customer delivery windows are all simultaneously respected, providing the user with real-time network visibility of planned shipments, in-transits, available inventory, and expiring product.

By dynamically searching for product availability throughout the network, the fulfillment system 100 minimizes lost revenue by ensuring customer requirements are met despite unanticipated delays in production, cross-border shipments, or transportation. In addition, through the use of user-controlled allocation strategies, the fulfillment system 100 ensures that in times of prolonged product shortage, customers continue to receive appropriate supply allocations. By launching proactive alerts to distribution planners when product replenishments are in danger of falling unexpectedly short, the fulfillment system 100 makes it possible to avoid product shortages. Also unlike other distribution planning tools, the fulfillment system 100 also alerts the user at the first sign of excess, obsolete, or expiring inventory. Through this early intervention process, "push" logic, and customer-specific date sensitivity tracking, potentially unusable inventory can be appropriately redeployed within the network.

The fulfillment system 100 of the present invention decreases expediting and inventory costs, while maximizing customer service by orchestrating time-phased product/material flow; optimizing inventories across a multi-echelon network, providing networkwide visibility including customer and supplier locations, allocating critical goods during supply shortages and creating optimal deployment master production, and procurement plan. Additional features and benefits for the fulfillment system 100 include more optimal inventory planning to decrease inventory costs, dynamic deployment, and of good to improve service. In addition, the improved procurement optimization allows the fulfillment system 100 to decrease supply costs. The fulfillment system 100 further increases date sensitivity in inventory to reduce obsolescence.

Returning to As illustrated in FIGS. 1A-1B, the fulfillment system 100 divided into a distribution component 200, a deployment component 300, a production component 400, a material allocation component 500, and a database 600. Each of the components is described in greater detail below.

Database 600

The database 600 serves as a central information storage device through which the other modules may access and obtain needed information for operation. The database 600 generally contains information on the various aspects of a business's supply chain, including:

1) a list of SKU's,
2) indication of storage location for each SKU and amount of each SKU at each location,
3) information on how each SKU is replenished (sourcing table), such as the source, rate, and cost of the replenishment,
4) a minimum safety level for each SKU at each location,
5) an indication of the storage cost for each SKU at each location, and
6) information on how each SKU is to be distributed: when, where, how much, at what cost for each SKU.

Distribution Module 200

The distribution module 200 functions primarily to analyze any changes in the supply chain data in the database 600 and then to suggest a course of action as needed to meet existing orders and commitments despite the changes to the supply chain. A central component of the distribution module 200 is the planning component 210 used to generate planned arrivals and planned orders to meet replenishment requirements for stock-keeping units (SKUs). By coordinating with deployment module 300, described below, the planning component 210 also can generate recommended shipments that consider inventory constraints in addition to demand.

In one embodiment, a user, when employing an external execution system to release production orders and vendor orders, may use a scheduling component 220 to provide input to that system. Data regarding scheduled receipts from that external system can then be imported into the data storage device 600. The planning component 210 function treats those scheduled receipts as replenishments of inventory.

After a planning period has begun, it can be assumed that the demand that was forecast for the period has begun to be realized. When the planning component 210 calculates a plan, the system assumes that if a certain percentage of time has passed within a forecast period, then an identical percentage of the forecast, as of that point in time, has been consumed. Usually, the system 100 automatically preserves the allocated forecast regardless of the demand to date.

In another embodiment, the user has the option of telling the system 100 to prorate the forecast by demand to date. To prorate the forecast by demand to date, the planning component 210 defines the start date of the proration period as the earliest start date of the forecast records, and the proration period as the start date, plus the duration specified by the user. The planning component 210 then accumulates forecasted demand—that is, the portion of the allocated forecast that occurs during the proration period for all forecast records.

Next, the user can tell the system to supplement forecasted demand with customer orders, which may provide more timely and accurate information than the short-term forecast. To do this, the user may first define a time period during which the system adjusts the forecast with customer orders. Then, the user may select a forecast adjustment rule to tell the system 100 whether and how to adjust the forecast with customer orders. The user has several options. These options include the following:

1) Do not supplement the forecast with customer orders.
2) The system ignores the forecast and uses customer orders as the demand instead.
3) If the forecasted customer orders exceed the forecast, the system uses the forecasted customer orders. If the forecast exceeds the forecasted customer orders, the system spreads the difference over the duration. This difference, added to the forecasted customer orders, then comprises the demand.
4) If the forecasted customer orders exceed the forecast, the system uses the forecasted customer orders. If the forecast exceeds the forecasted customer orders, the system reallocates the difference over the Customer Order Duration.
5) The system allocates the difference between the total forecast and total forecasted customer orders, beginning with a last period and working backward.

6) When known customer orders exceed the forecast, the planning component 210 takes short-term customer orders into consideration, as well as forecast. With this rule, the user may define a second duration, in addition to the customer order duration during which the planning component 210 adjusts the forecast with short-term customer orders.

In one embodiment, the planning component 200 allows the user to specify a maximum number of planned arrivals or planned orders that the planning component 210 will create for a single SKU. The planning component 210 creates a replenishment of the planning component 210 for the SKUs or the item families. From the SKUs the user selects, the planning component 210 determines which ones were marked for exchange within a supply chain and generates a new replenishment of the planning component 210 for each of those. The planning component 210 does not calculate supply chain data for external SKUs (i.e., supply chain data from external systems), but it does use their data in calculating the planning component 210s for other SKUs, and it will mark them for exchange.

Using the sourcing table in the database 600, the planning component 210 determines a level for each SKU. Level zero may consist of SKUs that have no destinations or parents. Level one SKUs are sources or subordinates that replenish SKUs at level zero. The highest-numbered level consists of source or subordinate SKUs that have no sources or subordinates. The planning component 210 generates planned arrivals or planned orders for one item at a time. Within each item, it plans generally all the SKUs at one level before planning the next level, beginning at level zero. Going through the planning period, the planning component 210 processes all demand for the SKU. When the planning component 210 begins planning a SKU, it calculates new end dates for a planning lead time and the freeze period.

The planning component 210 retains existing planned arrivals and planned orders whose arrival date or scheduled date is after those new end dates and before the end of the existing time fence. The planning component 210 will not create new planned arrivals or planned orders whose scheduled arrival date or scheduled date falls within the lead time.

The user can specify whether he/she wants the planning component 210 function to retain firm planned orders within the freeze period or lead time. The planning component 210 retains all firm planned orders whose schedule dates fall prior to either the manufacturing freeze period or the manufacturing lead time, whichever is longer. Otherwise, the user may want the planning component 210 to delete firm planned orders within the freeze period or lead time.

First, the planning component 210 determines the next date/time when a replenishment is needed—the date/time when projected stock available becomes 0 or less or when the projected stock falls below a minimum desired inventory level. The planning component 210 finds that date/time by subtracting each projected demand quantity from projected stock on hand at the source at the date/time of the demand.

The system makes sure the net requirement date is after the lead time duration and the time fence duration, since no planned arrivals or planned orders can be calculated within this duration. If the date is before the end of either of those durations, the planning component 210 looks at the next open date—the earliest date that is after those durations when the arrival calendar (for purchased SKUs) or production calendar (for manufactured SKUs) is open. If the net requirement has not been met at that date/time, the system 100 will generate a planned arrival or planned order. The original needed arrival date or needed date will be the original need date, such as the date on which the SKU must be shipped for on-time delivery.

If the planning component 210 adjusts the scheduled shipping date of a planned arrival because the source SKU's allocation calendar is not open for shipping, it also adjusts the scheduled arrival date. The planning component 210 checks the arrival calendar to verify that the destination is open on the new date and, if necessary, adjusts the arrival date again.

For each date/time when a demand quantity occurs, the system calculates projected demand as the sum of an adjusted allocated total forecast, non-forecasted customer orders, adjusted forecasted customer orders, total shipments from this source (to customers and for internal use), total amount in transit to customers, dependent demand, and safety stock.

For each date/time when there is a demand quantity, the system projects stock on hand at the destination as the sum of the current inventories on hand, the total amount of SKU in transit into inventory that will be available by a required delivery date, and future amounts of the SKU to be received before a delivery date.

For a distribution planning SKU that is replenished by more than one source, the system splits the net requirements among the sources. The system then calculates the replenishment quantities for each source.

Generally, the planning component 210 begins planning at the end of the period. Any demand that occurs within the period is aggregated together and met with a single planned order. The scheduled date of the order is set to the end of the period. The need date is set to the date on which the first demand occurs, i.e., the date of the first order. Alternatively, the planning component 210 generates planned orders to cover demand that occurs within the period, aggregating demand, as necessary.

The planning component 210 may generate a planned replenishment (quantity and scheduled date) at the first point in time that projected availability was less than zero without regard to any subsequent firm replenishments. However, this behavior may result in overproduction and overshipment of a product, since firm supply that is actually available may not be considered. In a preferred embodiment, the planning component 210, planning takes replenishments scheduled after the lead time into account when calculating an initial planned replenishment.

The planning component 210 may consider the timing of the first scheduled planned replenishment within the planning horizon. Alternatively, the planning component 210 may observe firm replenishments within a specified time range and reduce or eliminate earlier planned replenishments that are not needed. The planning component 210 observes all firm replenishments within the restricted planning component 210 duration and reduces or eliminates earlier planned replenishments that are not needed. Whenever a planned arrival or planned order is created prior to a firm planned replenishment, its quantity will be the minimum amount required such that at some point later in time, but before the restricted planning duration, the projected available quantity will be zero.

With this embodiment, the planning component 210 determines planned replenishment quantities and dates using the following rules, in order of priority:

1) Respect minimum and incremental rounding quantities;

2) Avoid future overstock within the restricted planning duration; and

3) Respect coverage duration and order up to quantity values.

Since this option will always eliminate situations of excess inventory by producing temporary shortages, it is recommended for items for which excess inventory costs are significantly greater than stock-out costs—for example, perishable items or items that become obsolete quickly.

The planning component 210 is modified prior to the latest planned replenishment within the restricted planning component 210 duration that brings the projected available above zero. The user sets the length of restricted planning period of time during which the planning component 210 observes firm replenishments that may restrict planned replenishments.

Companies that use an external execution system 10 to release production orders and vendor orders can provide input to and receive output from that system through the scheduling component 220 feature in fulfillment system 100. After the planning component 210 process has created planned orders, the user can export those orders to the external execution system 10. The external system 10 modifies the planned orders as necessary, then releases them as actual production orders or vendor orders. The user can then import those actual orders to fulfillment system 100 as scheduled receipts, to be used as replenishments by the planning component 210 and scheduling component 220. As illustrated in FIG. 1B, the external system 10 may connect to the fulfillment system 100 via an integration server 200 (connected to an application server 30 housing the fulfillment system 100. Likewise, a web client 40 may connect to the fulfillment system 100 through web services components 50 connected or associated with the application server 30. The scheduling component 220 recommends releasing planned orders within the scheduled receipts duration. Scheduling component 220 determines the start date/time and duration of the period to the planning component 210 orders for release.

The system 100 may export planned orders for release. The user may choose to export without manually confirming. The external execution system imports the planned orders, modifies them if necessary, creates production orders and vendor orders, and exports scheduled receipts to fulfillment system 100. When the system 100 calculates values, it considers planned orders and scheduled receipts. The system 100 then recommends a new group of planned orders for release, to be exported to the external execution system in the next cycle of batch processing.

Fulfillment system 100 includes several tools to help manage the user inventory. An important part of inventory management is ensuring that the user has planned correctly for safety stock. Safety stock is SKU inventory that must be on hand to protect against fluctuations in demand and supply for a SKU. Fulfillment system 100 can help the user determine how much safety stock the user requires for each SKU to prevent shortages or stock-outs from occurring.

The planning component 210 function within fulfillment system 100 also can help the user calculate statistical safety stock. Statistical safety stock is determined by taking into account additional factors, such as the variability in the forecasts for SKUs, as well as the user customer service objectives. For example, the user may need the planning component 210 for safety stock based on a percentage of customer orders that the user must be able to fill during each period.

Fulfillment system 100 provides the user with several methods for calculating safety stock. The system calculates safety stock values based on the rule the user selects. The rules for calculating safety stock fall into four categories: manual, forward coverage, statistical safety stock, or a combination of forward coverage and statistical safety stock. The user may want to manually set a safety stock quantity. The system calculates safety stock as either a quantity that the user sets an absolute minimum stock, whichever is greater.

The user may also choose to use duration forward coverage for adjusted independent demand, total forward coverage, or total forward coverage plus statistical safety stock for independent demand. These three rules calculate the number of units of demand within the forward coverage duration, either adjusted independent demand or total demand.

The system can use either a single safety stock forward coverage duration over the entire planning horizon, or a time-phased forward coverage duration. With a single forward coverage duration, the system calculates demand from the beginning of the planning period over a specified duration.

A time-phased coverage duration allows the user to specify a different coverage duration for different portions of the planning horizon. This feature is valuable for companies that want to specify a longer coverage duration for specific periods of peak demand and a shorter duration when demand is lower.

To set up a database to calculate safety stock using time-phased forward coverage durations, the user may divide SKUs into groups that show similar seasonality and are generally promoted at the same time. For each of these SKU groups, the user defines a template in the database 600.

After the user defines the template, the user may create the data for the template. To specify a time-phased forward coverage duration, the user may enter a value specifying the coverage duration to be added. The user also may define the date when the forward coverage duration takes effect. The user may assign SKUs to a template.

When system 100 calculates safety stock for a SKU that is using a safety stock rule with a forward coverage component, it checks the template. If the SKU is assigned to a template, the system finds the rows in the data in the database 600 that apply to the specified template. Using the effective date specified in the template, the system determines the total number of days of forward coverage, or the forward coverage duration.

For any periods that fall outside of those specified in templates, the system uses a value of zero both for the base forward coverage and the incremental forward coverage.

Using either total demand or adjusted demand, the system totals the units of demand within the forward coverage duration; this number may be used as the safety stock as of this number and may be added to the calculated statistical safety stock value.

When the user selects to use a statistical safety stock, the planning component 210 calculates a value for statistical safety stock based on the forecast error found using different statistical rules and levels of customer service. Before it can calculate statistical safety stock, the system must have a Mean Squared Error (MSE) value for each SKU. The user may import error statistics from another system application.

The user may specify the measure against which the statistical safety stock is calculated, in terms of either unit fill or order fill. Unit fill and order fill are two standard measurements for determining if a company is meeting its objectives for achieving and maintaining customer service. With unit fill, the statistical safety stock is calculated to approximate the percentage of goods (units) ordered during a planning period that can be filled from stock. With order fill, the system calculates the safety stock to be the expected percentage of customer orders that can be completely filled from stock. Both rules use a normal distribution. To indicate the target level of customer service, the user may specify a value of between 0 and 1 to represent the percentage of goods or orders that the user expects to fill from safety stock.

Alternatively, the user may use the Poisson distribution to calculate statistical safety stock. The Poisson distribution is good for modeling customer demand for low volume products where the demand is small and infrequent and the quantity per order is constant, such as industrial machinery or steel used in heavy manufacturing. When calculating statistical safety stock with a Poisson distribution, the standard deviation is equal to the square root of the mean as expressed in Equation 1.

$$SSS = u(a + f \times sqrt(a)) \qquad \text{(Equation 1)}$$

where:
 u=the average demand per order in units per replenishment period.
 a=the average number of orders during the lead time
 f=safety factor derived from the following Table 1 based on the value of 9 statistical safety stock customer service level. If the desired customer service level does not appear in the table, the safety factor is derived by linear interpolation.

TABLE 1

| Statistical Safety Stock Customer Service Level | Safety Factor |
|---|---|
| 0.50 | 0.0 |
| 0.75 | 0.7 |
| 0.80 | 0.8 |
| 0.85 | 1.0 |
| 0.90 | 1.3 |
| 0.95 | 1.7 |
| 0.98 | 2.1 |
| 0.99 | 2.3 |
| 0.999 | 3.1 |

The user may then use Equation 2 to calculate new values for statistical safety stock.

$$\text{Safety Fator} \times \sqrt{SKU \times \frac{\text{Lead Time}}{\text{Forecast Duration}}} \qquad \text{(Equation 2)}$$

The system 100 allows a user to see how the components of a SKU's inventory are affected by changes to its forecast or distribution plan: average cycle stock, average intransit stock and safety stock. The user can manipulate those inventory components by changing database values that affect the forecast or the plan, then opening an update model or the planning component 210 process. For instance, the user can look at the average projected available stock for the calendar period. Traditionally, inventory consists of four components: safety stock, intransits, cycle stock, and anticipatory stock (stock build-ups due to a promotion, for example).

As projected stock changes, the system divides the calendar period into intervals—a new interval each time the rate changes. It then calculates an average projected stock for each interval, based on the values at the beginning and at the end of the interval. The system multiplies the average value for each interval by the duration of the interval, totals the results, and divides by the duration of the calendar period.

The system 100 also can indicate the average amount of stock intransit during the calendar period, calculated as in the following equation 3. In this equation, is the index set over all replenishments in the calendar period.

$$\frac{\text{Sum of}(\text{Intransit lead time}_{(i)} \times \text{LoadLine:Qty}_{(i)})}{\text{Duration of Period}} \qquad \text{(Equation 3)}$$

The system allows the user to evaluate the inventory position of a sourcing network relative to its demand. For instance, the system 100 may display a table presenting projections for the distribution network sourced from a SKU for a specific time period. The column may let the user view the sources for an individual SKU at a particular location.

Table 2 shows a sample sourcing relationship from the sourcing table and the network membership it defines.

TABLE 2

| Item | Source | Dest | Effective | Factor |
|---|---|---|---|---|
| Cookie | Z | A | 1/5 | 1 |
| Cookie | A | B | 1/15 | 1 |
| Cookie | A | C | 1/15 | 1 |
| Cookie | Z | D | 1/23 | .5 |
| Cookie | C | D | 1/23 | .5 |
| Cookie | A | C | 2/15 | 0 |
| Cookie | Z | C | 2/15 | 1 |
| Cookie | Z | D | 2/19 | 0 |
| Cookie | C | D | 2/19 | 0 |
| Cookie | A | D | 2/19 | 1 |
| Cookie | Z | A | 1/5 | 1 |

Because a SKU can have multiple sources, it can be a member of many networks at the same time. The system 100 aggregation computations account for multiple memberships by assigning each membership a factor. The membership factor is the product of the factors of the SKUs source and any other sources above it in the distribution network. For computational purposes the top of the network is always assigned a factor of one. Membership is computed over the entire duration for which orders will be evaluated. This is necessary to correctly evaluate an order's status with regard to the network.

Depending on the data contained in a column, the system uses one of two styles of aggregation forecast or inventory.

The system uses forecast aggregation in situations where data represents information at a particular point in time—such as demand or planned orders. When sourcing changes occur within the middle of a coverage duration, the system continues to aggregate the data to the network source/factor in effect at the beginning of the coverage period. This is because the planning component 210 process does not implement new sourcing relationships during the middle of a coverage duration period. For example, 10 units of demand exist in a single coverage period between 1/1 12:00 and 1/5 12:00; if the network membership is terminated at 1/4 12:00, all 10 units will still be aggregated to the initial source.

Alternatively, the system uses inventory style aggregation in situations where the data represents information as of the beginning or ending point of each time period, depending on how the userview is configured to report inventories.

Several of the columns represent network coverage durations. These columns determine how long the network is able to meet demand without replenishment. While the specific supply columns used to derive the coverage duration change with the coverage duration type, the same basic algorithm is used. Coverage duration is calculated as the duration of demand that can be subtracted from the initial supply without a result of less than zero. This calculation is independent of a userview calendar. The duration calculated is not in any specific unit of measure such as Day or Hour, but can be represented in any unit of measure currently supported by the system's displayed duration columns.

Network supply used in the calculation changes with the coverage duration type. The initial demand period used in the calculation differs based on the userview time allocation period selected. If a time allocation of Begin is used, the current period's demand is subtracted from the supply. If a time allocation of End is used, the current periods supply is already reduced by the demand and is not included in the calculation.

Many companies, particularly retail operations, have special requirements for handling unmet demand when generating replenishments. With these companies, if demand for a given item is not met, that demand goes away. For example, if a preferred brand of laundry detergent is not available, a customer is not likely to wait until it does become available; he or she purchases an alternate brand. So, the unmet demand for the preferred brand would be fulfilled using the alternate brand.

To avoid inflating demand in this situation, the planning component 210 eliminates unmet demand when generating replenishments. Alternatively, in the fulfillment system 100, the planning component 210 may always have tried to meet all demand, even demand that was past due, by creating backorders.

In one embodiment, the planning component 210 performs an additional adjustment to the demand for which it is generating replenishments. With this feature, the planning component 210 reduces total demand by the amount that cannot be met before the first replenishment is scheduled. The user can specify which demand components the system uses to reduce demand.

To eliminate unmet, the user needs to define demand reduction methods that specify which demand components the system is to use to reduce total demand. To do this, the user creates a table in the database 600 for the demand reduction methods the user wants to use. Each row in the table defines a demand reduction method, identifies it with an identifying code, and specifies which components of demand that demand reduction method will use when it reduces total demand.

Once the user defines demand reduction methods in the table, the user needs to determine which SKUs will have demand adjustments and which component of demand will be used to perform the adjustments. To determine how much demand is unmet, the planning component 210 needs to know when the first replenishment can be scheduled. In general, this is the first open date in the appropriate calendar after the lead time. For purchased SKUs, this is the first date in the Arrival calendar after the purchasing lead-time. For manufactured SKUs, this is the first date in the production calendar after the manufacturing lead time. In either case, the planning component 210 calculates this date and stores. In either case, the planning component 210 generally assumes that all demand after first replenishment date can be met.

Planning component 210 determines the amount of firm supply available before the first planned replenishment. The system 100 calculates this as the sum of total intransits in, planned orders, scheduled receipts, total arrivals, total intransits out (to account for committed inventory), and on hand. Adjustments generally occur only within the period prior to the first replenishment date. To determine how much demand is actually unmet, the system consumes firm supply within that period. Using the reduction method specified for the SKU, the system reduces total demand by removing the forecast components (defined in the demand reduction method) that cannot be met on time.

If perishable items, such as dairy or meat products, or some promotional items are part of the user inventory, the user can use a tool provided by fulfillment system 100 to help the user calculate an optimal replenishment plan. This tool, which is a component of the distribution planning process, manages date-sensitive inventory. Without this component, planning component 210 does not include the shelf life of a product in its calculations.

The following sections of this document define the terms and concepts related to date-sensitive inventory planning, describe the planning process, and tell the user how to work with the resulting plan, describe the database components used specifically with the tool, explain what settings the user needs to make to produce the user's own plan, and finally, provide examples to illustrate the feature.

To understand the concepts and the considerations that must be made in planning the distribution of products that have a limited usable life span, the following terms are now defined.

"Shelf life" is the amount of time an item can remain in inventory before it expires. Since different portions of on-hand stock may have been produced at different times, the stock also can expire over time. For example, inventory that includes a case of canned beans produced on Sep. 1, 2000, that expires on Sep. 1, 2002, could share a location with a case of beans produced on certain kinds of items can vary by time and location for the same kind of item. For example, the shelf life for a type of dairy product such as hard cheeses stored in Canada may have a longer shelf life than the same type of item stored in Florida. Minimum shelf life is the minimum amount of shelf life that an item must have remaining in order for a customer to accept it.

"Effective shelf life" (ESL) is the difference between the shelf life and the minimum shelf life of an item. For example, an item with a shelf life of 12 days and a minimum shelf life of 7 days would have an effective shelf life of 5 days. In other words, since the shelf life is 12 days, and a customer will only accept an item if it has at least 7 good days left, there are only 5 days left for planning how the item is to be distributed. After 5 days, since no customer will accept the item, it becomes unusable.

"Minimum effective shelf life" is the lower limit placed on the effective shelf life of a product and is used by the planning component 210 in deriving an expiration date for certain types of replenishments.

"The coverage cycle" is the cycle of planned replenishments that begins when the first replenishment is scheduled and then repeats after the coverage duration through the planning horizon. During the distribution planning process, the system 100 adjusts the coverage duration for planned arrivals and for planned orders to maintain a feasible supply network.

"The expiration date" is the date on which a supply of an item expires. In fulfillment system 100, the expiration date, which is one of the variables used by planning component 210 to create a replenishment of the planning component 210 for date-sensitive inventory, fits into one of the following categories: expiration date determined by outside sources, hard expiration date, and derived expiration date.

Some expiration dates, such as those for scheduled receipts and on-hand inventory, are determined by outside sources. Expiration dates for such items are set outside the fulfillment system 100 application. For instance, the expiration may come from an external system 10, as illustrated in the system of FIG. 1B.

A hard expiration date is used with products that have a limited shelf life based on a date rather than a duration. An example of this type of product is a printed calendar. A calendar that includes dates from January 2000 to December 2000 is useless on Jan. 1, 2001. In essence, this product expires on Dec. 31, 2000. Similarly, many promotional products, such as holiday-specific items, may be modeled in this way.

A hard expiration date generally takes precedence over a derived expiration date. Consequently, the hard expiration date allows a promotional cutoff for an item that also is truly perishable. For example, if a planned order had an expiration date of Mar. 31, 2000, and the SKU had an expiration date of Mar. 28, 2000, the planned order would be adjusted to March 28. Planning component 210 does not schedule replenishments on or after the expiration date of an SKU.

Derived expiration dates are those that are generated from within the fulfillment system 100 application and belong to planned arrivals and planned orders for products with a limited shelf life. The calculation of this date can vary according to the type of inventory or replenishment, the time constraints, the location of the item, and when the replenishment is scheduled.

Determining the requirements for replenishments with a limited shelf life necessitates another component additional to the standard planning component 210 input. That component is unusable on-hand inventory. When inventory exceeds its effective shelf life, it can no longer be used to meet demand. This inventory is removed from the projected on-hand inventory during the planning process. As replenishments are created, the corresponding unusable inventory is calculated and subtracted from the projected on-hand inventory, so that subsequent replenishments meet the full requirement.

Among the date-sensitive replenishments for which expiration dates are derived are those whose shelf lives vary over time, and for which, therefore, additional shelf life data must be considered. For example, an item may have a longer shelf life if it is produced in the winter than if the same item is produced in the summer. These are categorized into shelf life groups to aid in deriving accurate expiration dates. The shelf life for most items does not vary over time. However, items with shelf lives that do vary over time can be categorized into families, or shelf life groups, that share time variations.

The planning component 210 process derives expiration dates for planned arrivals and planned orders using the following logic: Planned arrivals represent a requirement on their source more than they represent a supply at their destination. In other words, a planned arrival for a destination indicates to the source that there is a requirement for a certain amount of inventory on a certain date at the destination. Since the planned arrivals do not observe constraints, there is no guarantee that the inventory will be available. Consequently, the expiration date on a planned arrival represents the shelf life requirement on the inventory that the source uses to meet this shipment.

The derivation of the expiration date for a planned arrival depends on the scheduled arrival date, the distribution planning (DRP) coverage duration, the safety stock coverage duration, and the minimum shelf life of the destination. Note that the shelf life duration effective at the scheduled arrival date for the destination SKU also is important. However, while it is used to determine the feasibility of producing a planned arrival, it is not part of the derivation of the expiration date.

The real requirement on a planned arrival is that the shipment must have a long enough shelf life to be usable until the next planned arrival. This means that the effective shelf life must be at least as long as the coverage duration is the length of time for which demand is to be covered by planned arrivals. Consequently, the effective shelf life must be greater than or equal to the coverage duration. It follows, then, that the expiration date for a planned arrival with no safety stock is the scheduled arrival date plus the minimum shelf life of the destination SKU plus the coverage duration. This is true if there is no safety stock. If safety stock is part of the inventory, it must be used before it goes bad. In such a case, therefore, the safety stock coverage duration must be included in the derivation of the effective shelf life.

There are, however, certain exceptions to the replenishment scenarios discussed so far. For instance, an exception arises if the planning component 210 schedules planned arrivals that bring stock on hand up to a maximum storage amount at any time in which stock on hand is projected to fall below the minimum stock level. For such situations, the planning component 210 includes the minimum effective shelf life of an item in its calculations when generating a planned arrival, and the minimum effective shelf life is the lower limit placed on the effective shelf life of a product. For planned orders, the expiration date is the scheduled date plus the shelf life duration that is effective at the scheduled date.

This section discusses the functional steps used in the process of planning for inventory with a limited shelf life. Only the steps that depart from the standard planning component 210 are described here in depth. Steps that remained unchanged, such as forecast proration and leveling logic, are not described. Briefly, the planning component 210:

1. Prorates the forecast.

2. Adjusts the forecast.

3. Calculates replenishment requirements:
    a. Applies leveling logic based on sourcing requirements.
    b. Generates planned replenishments. This step includes expiration date, shelf life duration, coverage cycle, maximum waste factor, and projected unusable on-hand inventory information and applies demand reduction logic.
    c. Adjusts the coverage durations.
    d. Makes adjustments to avoid waste.

4. Flags potential problems.

The application now describes the calculation of replenishment requirements with and without destinations. For SKUs with no destinations, the planning component 210 determines the requirements using standard planning logic, except in the case of unusable inventory. The planning component 210 generates replenishments to maintain non-negative projected available inventory beginning from the first point that the projected availability goes below zero, then once for each coverage cycle after that. For SKUs that have destinations, the distribution demand must be treated separately from the other requirements. The reason is that forecast, customer orders, and dependent demand can be assumed to have the same shelf life requirements, as determined by the minimum shelf life. However, the same assumption cannot be made for planned shipments. Since different locations can have different minimum shelf life requirements for the same item, and these values also can vary over time, each planned shipment must be considered individually. The first replenishment date is the earlier of the first replenishment needed to meet distribution demand, and the first replenishment needed to meet any other requirement (including safety stock).

The coverage cycle begins at the first replenishment date. The coverage cycle may be violated by distribution requirements, since inventory created for a given coverage period may not be fresh enough for a distribution requirement late in that coverage period. For nondistribution requirements, the coverage cycle should be maintained, except for calendar and rounding restrictions.

To illustrate how the planning component 210 calculates replenishments for date-sensitive inventory, a manufactured SKU will be used that has a coverage duration of 5 days, a shelf life of 12 days, and a minimum shelf life of 7 days. The coverage cycle for this SKU begins on Apr. 3, 2000 00:00. So, this replenishment should cover all nondistribution requirements through Apr. 7, 2000, 23:59.

In addition, one of this SKU's destinations has a lead time of two days, a coverage duration of two days, a minimum shelf life of seven days, and needs a shipment to arrive on Apr. 7, 2000. This means that this replenishment should ship on Apr. 5, 2000. Then, the required expiration date on this shipment is (Apr. 7+2 days+7 days) April 16. If the shelf life at the destination is the same, the inventory that is shipped must be produced on or after Apr. 4, 2000, in order for it to be fresh enough to meet the destination requirement. Since it must ship on Apr. 5, 2000, planning component 210 schedules production to meet this requirement based on the scheduled ship date.

On the other hand, if the scheduled arrival date is Apr. 5, 2000, instead, the freshness requirement could be met with production on Apr. 3, 2000. So, when possible, the planning component 210 aggregates production intended to meet both distribution and nondistribution requirements.

Standard planning component 210 assumes that once a product has been made, it can always be used. Waste is not considered. Consequently, if the planning component 210 needs to produce an entire minimum production quantity in order to meet one unit of demand, it does so and assumes that the remainder will be consumed over time.

The limit to the waste that the user will allow depends on several factors: the level of customer service the user wants to maintain, the cost of production, the cost of storage, and so on. Therefore, the user needs a way to specify, at the SKU level, how much the user is willing to waste in order to meet demand. This means that each SKU must have a maximum waste factor. This value is applied to the larger of the minimum replenishment quantity and the incremental replenishment quantity.

The product of the maximum waste factor and the largest replenishment quantity is referred to as the "maximum allowable waste." The planning component 210 reduces waste caused by rounding quantities for planned orders and planned arrivals, as follows: If a planned order results in an unusable quantity that exceeds the maximum allowable waste, the planned order is reduced by the incremental quantity until either the unusable quantity is equal to or less than the maximum allowable waste or the planned order quantity equals the minimum quantity. If producing only the minimum quantity results in an unusable quantity that exceeds the maximum allowable waste, then the order is eliminated.

If a planned arrival results in an unusable quantity that exceeds the maximum allowable waste, the planned arrival is reduced by the incremental quantity until either the unusable quantity is equal to or less than the maximum allowable waste or the planned arrival quantity equals the minimum quantity. If an arrival of only the minimum quantity results in an unusable quantity that exceeds the maximum allowable waste, then the arrival is eliminated.

Calendar restrictions can force the user company to produce inventory at less than ideal times and to ship it earlier or later than is optimal. In standard planning logic, planned arrivals are created at the destination based on when they are needed. After all of the destinations have been processed, the source adjusts the planned arrivals based on calendar restrictions. In general, this means shipping earlier than needed. If inventory is shipped too early, the inventory may spoil before the demand it was intended to meet occurs.

The distribution planning (DRP) logic for perishable items departs from standard planning component 210 to account for the source's calendar. This means that planned arrivals may intentionally be scheduled for later than they are needed. The manufacturing planning (MPS) logic has similar differences. In other words, instead of making inventory early because of restrictions in the production calendar, inventory may need to be produced later. This adjustment of schedule dates may cause problems for planned arrivals, particularly if the shipment needs to be scheduled early.

One of the consequences of avoiding waste of an item is failing to meet the demand for that item on time. Standard planning component 210 dictates that some forms of demand are not retained if the demand is not met. In other words, sales are lost. Using standard planning logic, demand can usually be met on time or early. Using date-sensitive inventory waste logic, however, replenishments are delayed, thereby risking lost sales. To counter the effects of delaying replenishments, demand reduction logic is used throughout the entire planning horizon instead of ending at the first replenishment date.

For date-sensitive inventory, in addition to the exceptions mentioned thus far, planning component 210 generates exceptions to alert the user to aging inventory. It is important to know when inventory has less than its minimum shelf life left because it might be good for alternate uses. For example, aging inventory might be used for promotional purposes, such as giveaways, or charitable purposes, such as donations to food banks. It also is important to know when to dispose of inventory that is no longer usable. For instance, the planning component 210 generates the following exceptions when the planning component 210 encounters inventory that has less than the minimum shelf left but has not yet expired, or planning component 210 encounters inventory that has expired.

The material planning component 230 of fulfillment system 100 calculates dependent demand for SKUs that are subordinates in a bill of material. The planning component 210 function (in the DRP component) creates planned arrivals and planned orders to cover demand for SKUs. With the material planning component 230, the planning component 210 also calculates dependent demand for SKUs that are subordinates in bills of material. The planning component 210 creates replenishment plans for subordinate SKUs. When the planning component 210 determines the level number of each SKU to be planned to ensure that parents are planned before subordinates, the planning component 210 creates replenishment plans for the SKUs or item families the user selects. For the planning component 210, an item family includes parents and subordinates. That is, the item family is not just one item at multiple locations and may also include other items.

Deployment Module 300

The deployment component 300 generates recommended shipments and allows the user to create and manage vehicle loads based on those recommended shipments. The deployment component 300 also provides the user with an integrated solution for implementing best practice distribution planning and transportation planning processes. Recommended shipments produced by the deployment component 300 can be used to construct transportation plans and build shipment requirements into loads.

To manage the deployment process in the deployment component 300, the user uses the planning component 210 to create recommended shipments based on both the demand at the destination SKUs and the actual stock available at the source. The planning component 210 stores the recommended shipments it creates in the database 600. Similarly, the user may employ a dynamic deployment component 211 option in the planning component 210, to resolve deployment exceptions using surplus inventory from alternate sources. Alternatively, the user may use an automated load builder 310, to combine recommended shipments into vehicle loads, or a load manager 320, to review and change loads, or manually create new loads.

Overall, the deployment process begins with the planning component 210, which creates a replenishment plan, then generates recommended shipments to cover the planned arrivals. The following sections explain the tasks the user needs to perform to generate recommended shipments.

DEFINITION OF TERMS

Deployment component 300 uses the terms described below.

Available To Ship Date: The earliest date that product is available for a recommended shipment and the source is open to ship product.

Allocation strategy: Defines the priorities for allocating stock to meet specified categories of demand when the source is limited.

Coincident demand: Demand of the same type and priority that occurs at the same point in time at one or more locations. Coincident demand can occur:

1. During limited processing within the minimum allocation duration, when the allocation strategy at one or more locations with the same location priority. When the planning component 210 is processing safety stock, all locations are considered to be of equal priority.

2. During unlimited processing (beyond the minimum allocation duration), when the planning component 210 is recommending shipments to meet planned arrivals. In the case of unlimited processing, all locations are considered to be of equal priority.

3. Beyond the recommend shipments duration, when the planning component 210 is in Push mode.

Constrained mode: A processing mode in which the planning component 210 checks to see whether stock is limited within the minimum allocation duration. In unconstrained mode, the planning component 210 assumes there are no constraints on supply when recommending shipments from a source SKU. A recommended shipment is made for every planned arrival within the recommend shipments duration.

Fair share: Calculation that the planning component 210 uses to determine which portion of stock goes to each piece of demand when source stock is insufficient to meet all coincident demand.

Lead time: The transportation time between two points for a specific transportation mode.

Limited: If a source location is unable to meet all demand that occurs within the minimum allocation duration due to stock unavailability (as opposed to a closed calendar), then the source is said to be limited. Being able to meet demand also includes meeting that demand on time.

Limited-stock allocation logic: Logic that the planning component 210 uses during the minimum allocation duration to recommend shipments when source stock is limited.

Location Priority: Designates an order of precedence among locations in the event that supply is limited within the minimum allocation duration. Demands at locations with highest priority (1) are met first. The planning component 210 does not consider location priority when it processes safety stock.

Major Ship Quantity: The minimum quantity for which deployment will create recommended shipments. The quantity is based on shipping lanes and can vary over time.

Minimum Allocation Duration: Duration during which the planning component 210 tests for limited stock. Stock cannot be limited outside of the minimum allocation duration. Nevertheless, stock can run out after the duration while the planning component 210 is trying to meet demand.

Minor Ship Quantity: Once the major ship quantity has been fulfilled, subsequent increments in recommended shipment quantities must be in this quantity. Minor shipping quantity is based on shipping lanes and can vary over time.

Needed Arrival Date: The date on which product is needed, calculated by Distribution Planning.

Needed Shipping Date: The last possible date that product can be shipped and still arrive on the Needed Arrival Date.

OHPost: The last time current on-hand values were posted for an SKU. Typically, this is set after transaction data has been imported.

Partial Recommended Shipment: If the planning component 210 does not have enough stock to meet all the demand but can meet part of the demand, it creates a partial recommended shipment. It meets the remainder of that demand if replenishment stock is made available at a later date.

Planning Duration: The amount of time which, when added to OHPost, defines the time interval during which Planning Component 210 will generate planned arrivals to meet demand.

Push Mode: A processing mode that tells the planning component 210 to recommend shipments to meet any demand (except independent demand and safety stock) that occurs after the recommend shipments duration and prior to the end of the planning duration, if any stock remains at the source. With push mode, the planning component 210 ships all available stock when it becomes available. The opposite of push mode is shipping stock when it is needed.

Recommend Shipments Duration: Duration during which the planning component 210 generates recommended shipments. The user sets this value on the planning component 210 properties dialog before the user opens the planning component 210 process.

Scheduled Arrival Date: The date on which the planning component 210 determined it could deliver the replenishment. This date is typically the scheduled shipping date plus the lead time, plus any time required for an arrival calendar adjustment. The scheduled arrival date can fall after the needed arrival date, indicating that stock was not available on time and/or a calendar forced the shipment to be late. The scheduled arrival date can occur prior to the needed arrival date, indicating that supply was available earlier and a calendar forced the planning component 210 to find an earlier arrival date so that the shipment would not be late.

Stock Available Duration: Duration during which the planning component 210 considers replenishments at a location as available inventory.

Transportation Window: A period of time beginning with the available to ship date and ending with the needed arrival date during which the system 100 can reschedule a shipment for cost purposes.

The planning component 210 can recommend shipments in one of two modes: either unconstrained or constrained. In unconstrained mode, the planning component 210 assumes there are no constraints on supply when recommending shipments from a source SKU. By default, source stock is unlimited. In constrained mode, the planning component 210 checks to see whether stock is limited within the minimum allocation duration. Source stock is limited if it is projected to become negative at any time during this duration. If it is limited, the planning component 210 uses limited-stock allocation logic to allocate stock to destination SKUs (and the source, if the source SKU is one of the locations with demand) within this duration.

For unconstrained mode, the user needs to define sourcing shipping quantities and then store this data in the database 600. Otherwise, for constrained mode, the user sets the following database components: sourcing, assign allocation, recommended shipments, and arrival calendars, set stock available duration and minimum allocation duration, assign location priorities, assign allocation strategies, and set push mode.

Similarly, for each source/destination pair for which the user wants the planning component 210 to recommend shipments, the user defines the portion of the destination SKU's replenishments that comes from a particular source SKU, and for each source/transportation mode combination, the transportation lead time or else a default transportation lead time for the transportation mode.

The user can change the sourcing for a particular destination over time using the effective date. Based on the effective date, the planning component 210 uses the source that is effective during the period into which the needed arrival date of the recommended shipment falls.

Deployment uses three calendars: an allocation calendar, a recommended shipments calendar, and the arrival calendar. These calendars are defined, then assigned to either destination or source SKUs, depending on what they are used for allocation. Calendars determine whether the source is open or closed for shipping. The planning component 210 also uses Allocation Calendars to spread the forecast over time.

An allocation weight assigned to each calendar period determines whether there is a forecast for the period and whether the source is open or closed for shipping in that period. If an allocation weight is 0, the source is closed for shipping and the forecast is set to 0. If the allocation weight is greater than 0, the source is open for shipping and there can be a forecast for that period. If the source is closed for shipping, the planning component 210 tries not to schedule shipments for that period. If it has to schedule a shipment during a closed period, it generates an exception message in the SKU exception table. Then, the system must aggregate safety stock and forecast and aggregate recommended shipments.

The planning component 210 uses the intervals in the recommended shipments calendar to aggregate recommended shipments generated in constrained mode, when stock is limited, for all types of demand such as demand specified by an allocation strategy plus firm planned arrivals and safety stock.

The planning component 210 groups together all recommended shipments with the same item, source, and destination whose schedule shipping date falls within a given interval. The quantity of the recommended shipment is the sum of the recommended shipments being aggregated. The scheduled shipping date of the aggregated recommended shipment is the beginning of the recommended shipments calendar interval. The available to ship date of the new aggregated recommended shipment is the latest available to ship date of all the recommended shipments that were combined together. The deployment component 300 then schedules recommended shipments generated when stock is unlimited. Each source SKU must have a recommended shipments calendar. Arrival calendars define the periods when the destination is open for receiving. The planning component 210 tries not to schedule shipments to arrive during closed periods of the arrival calendar. The planning component 210 uses the durations described in this section to determine how much inventory is available to ship, and whether supply is limited.

When planning component 210 is running in constrained mode, the system determines whether source stock is limited based on the quantity of stock on hand at the source and the amount of stock that becomes available during the stock available duration. Replenishments that fall outside the stock available duration are not considered available.

If you set the stock available duration longer than the minimum allocation duration, the planning component 210 uses the end date of the minimum allocation duration. With minimum allocation duration, source stock is limited if it is projected to become negative at any time during this duration. The planning component 210 uses a planning duration during push mode. During push mode, planned arrivals that fall beyond the recommend shipments duration but within the planning duration are met as recommended shipments. The planning component 210 uses a recommend shipments duration to determine how far out over the planning horizon to recommend shipments. The user sets this duration when you open the planning component 210 process.

The diagram in FIG. 7 illustrates one possible sequence for the stock available duration, the minimum allocation duration, and the recommend shipments duration. Any of the end dates may be the same. The end of the stock available duration should occur on or prior to the end of the minimum allocation duration, the end of the minimum allocation duration should occur on or prior to the end of the recommend shipments duration, and the end of the recommend shipments duration should occur on or prior to the end of the planning duration.

When the planning component 210 is running in constrained mode and source stock is limited within the minimum allocation duration, you can tell the planning component 210 which locations have priority over others when meeting demand. The planning component 210 will meet demand (firm planned arrivals and demand based on an allocation strategy) at locations with highest priority first. The planning component 210 does not consider location priority when it processes safety stock.

When the planning component 210 is run in constrained mode and source stock is limited within the minimum allocation duration, you can define the priorities for allocating stock to meet specified categories of demand. To do this, the user first defines allocation strategies by setting the priority for these demand types where different demand categories can share the same priority: dependent demand, adjusted allocated total forecast, distribution demand, forecasted customer orders, and nonforecasted customer orders the user may then assign the strategy to source SKUs.

When source stock is limited, the allocation strategy determines the order in which the planning component 210 allocates stock to meet demand within a given location priority.

For example, if the user assigns a priority of 1 to distribution demand, 2 to dependent demand, 3 to forecasted customer orders, 4 to nonforecasted in customer orders, and 5 to adjusted allocated total forecast, within each location priority the planning component 210 will allocate stock to meet distribution demand first. If there is inventory remaining after it meets distribution demand, it allocates stock for dependent demand, followed by forecasted customer orders, and so on.

The major shipping quantity and the minor shipping quantity affect recommended shipment quantities. Major shipping quantity is the minimum quantity that the planning component 210 uses when recommending shipments. Minor shipping quantity is an incremental shipping unit size, such as a case or tier. It is best to set major shipping quantity as a multiple of minor shipping quantity. The user can define different shipping quantities for each destination replenished by the same source. The user also can change these quantities over time.

The push option tells the planning component 210 to push stock out of the source when it becomes available instead of waiting until it is actually needed at the destination. When the planning component 210 is in push mode, it sets the scheduled shipping date to the available to ship date. When pushing, the scheduled shipping date will usually fall within the stock available duration unless a closed calendar causes the shipment to be delayed.

The planning component 210 process creates a replenishment of the planning component 210 and recommends shipments for the SKUs or item families the user selects. First, the planning component 210 creates planned arrivals. Then it recommends shipments to cover the planned arrivals. When the planning component 210 begins recommending shipments for an SKU, it may delete all existing recommended shipments for that SKU from the database 600.

The planning component 210 does not use calendars (allocation, recommended shipments, or arrival) when it recommends shipments in unconstrained mode. It assumes that the dates of the planned arrivals (which the planning component 210 calculated using the allocation and arrival calendars) are valid.

The planning component 210 recommends shipments that are constrained by the quantity of stock on hand at the source. In constrained mode, the planning component 210 determines whether source stock is limited during the minimum allocation duration. If a source location is unable to meet all demand that occurs within the minimum allocation duration due to stock unavailability (as opposed to a closed calendar), then the source is said to be limited. Being able to meet demand also includes meeting that demand on time.

To determine whether source stock is limited, the planning component 210 calculates stock that becomes available within the stock available duration. Replenishments that fall outside the stock available duration are not considered available. When determining whether source stock is limited, the planning component 210 includes recommended shipments in source stock only if their arrival date is within the stock available duration.

The planning component 210 calculates the quantity of source stock that is available to ship as the sum of SKU on hand, including safety stock, scheduled receipts into the source within the stock available duration, total intransits into the source SKU within the stock available duration, and total recommended shipments into the source SKU within the stock available duration, minus intransit amounts that are still considered part of the source on hand.

Alternatively, planned orders and firm planned orders also may include the supply calculation at the source.

If there is enough stock at the source to meet demand—that is, source stock is not limited with the minimum allocation duration, the planning component 210 converts planned arrivals to recommended shipments. The planning component 210 determines the earliest date on which there is at least a major ship quantity on hand. If there is enough stock available on this date to meet the planned arrival quantity, then the planning component 210 meets it. If the stock level is lower than the planned arrival quantity (but equal to at least a major ship quantity), the planning component 210 creates a recommended shipment rounded down to major and minor shipping quantities. Planning subtracts the quantity of the recommended shipment from the planned arrival. The remaining planned arrival quantity is retained as part of demand. The planning component 210 then repeats the process for the modified planned arrival.

The planning component 210 sets the available to ship date to the earliest date on which there was at least a major ship quantity on hand. If the push option is inactive, the planning component 210 sets the scheduled shipping date to the need to ship date. Otherwise, the planning component 210 sets the scheduled ship date of the recommended shipment to the available to ship date.

If two or more recommended shipments have the same item, source, destination, need arrival date, scheduled arrival date, and available to ship date, the planning component 210 aggregates them—that is, it creates one recommended shipment whose quantity is the sum of the quantities of the individual recommended shipments. If there is coincident demand at multiple locations, the planning component 210 performs a fair-share allocation as described below.

While pushing, if the planning component 210 does not have enough stock to meet coincident demand at multiple locations (regardless of location priority), the planning component 210 must perform fair-share allocation (see the section).

EXAMPLE

Table 3 shows how the planning component 210 creates recommended shipments when source stock is not limited within the minimum allocation duration. Assume the following set of planned arrivals in Table 3:

TABLE 3

| Source | Destination | NeedShipDate | Quantity |
|--------|-------------|--------------|----------|
| A | B | Jan. 2, 1999 | 50 |
| A | C | Jan. 2, 1999 | 100 |
| A | B | Jan. 4, 1999 | 50 |
| A | C | Jan. 4, 1999 | 100 |
| A | B | Jan. 6, 1999 | 50 |
| A | C | Jan. 6, 1999 | 100 |
| A | B | Jan. 8, 1999 | 50 |
| A | C | Jan. 8, 1999 | 100 |
| A | B | Jan. 10, 1999 | 50 |
| A | C | Jan. 10, 1999 | 150 |
| A | C | Jan. 12, 1999 | 150 |

Further assume the following set of scheduled receipts in Table 4:

TABLE 4

| Location | SchedDate | Quantity |
|----------|-----------|----------|
| A | Jan. 2, 1999 | 200 |
| A | Jan. 3, 1999 | 200 |

TABLE 4-continued

| Location | SchedDate | Quantity |
|---|---|---|
| A | Jan. 4, 1999 | 100 |
| A | Jan. 5, 1999 | 100 |
| A | Jan. 6, 1999 | 100 |
| A | Jan. 7, 1999 | 50 |

Assume an on-hand quantity of 250 at source location A. Also assume a daily recommended shipments calendar.

The planning component 210 generates the recommended shipments shown in Table 5 and Table 6. In Table 5, the push option is set to "Yes," so the scheduled to ship date is set to the available to ship date. In Table 6, the push option is set to "No," so the scheduled to ship date is set to the need to ship date. In both examples, no two records have the same item, source, destination, need to arrive date, scheduled arrival date, and available to ship date, so the planning component 210 does not perform any further aggregation.

TABLE 5

Final recommended shipments (unlimited stock, pushing)

| Source | Destination | Need to Ship Date | Available to Ship Date | Scheduled Ship Date (Pushing) | Quantity |
|---|---|---|---|---|---|
| A | B | Jan. 2, 1999 | Jan. 1, 1999 | Jan. 1, 1999 | 50 |
| A | C | Jan. 2, 1999 | Jan. 1, 1999 | Jan. 1, 1999 | 100 |
| A | B | Jan. 4, 1999 | Jan. 1, 1999 | Jan. 1, 1999 | 34 |
| A | C | Jan. 4, 1999 | Jan. 1, 1999 | Jan. 1, 1999 | 66 |
| A | B | Jan. 4, 1999 | Jan. 2, 1999 | Jan. 2, 1999 | 16 |
| A | C | Jan. 4, 1999 | Jan. 2, 1999 | Jan. 2, 1999 | 24 |
| A | B | Jan. 6, 1999 | Jan. 2, 1999 | Jan. 2, 1999 | 50 |
| A | C | Jan. 6, 1999 | Jan. 2, 1999 | Jan. 2, 1999 | 100 |
| A | B | Jan. 8, 1999 | Jan. 3, 1999 | Jan. 3, 1999 | 50 |
| A | C | Jan. 8, 1999 | Jan. 3, 1999 | Jan. 3, 1999 | 100 |
| A | B | Jan. 10, 1999 | Jan. 3, 1999 | Jan. 3, 1999 | 13 |
| A | C | Jan. 10, 1999 | Jan. 3, 1999 | Jan. 3, 1999 | 37 |
| A | B | Jan. 10, 1999 | Jan. 4, 1999 | Jan. 4, 1999 | 24 |
| A | C | Jan. 10, 1999 | Jan. 4, 1999 | Jan. 4, 1999 | 76 |
| A | B | Jan. 10, 1999 | Jan. 5, 1999 | Jan. 5, 1999 | 13 |
| A | C | Jan. 10, 1999 | Jan. 5, 1999 | Jan. 5, 1999 | 37 |
| A | B | Jan. 12, 1999 | Jan. 5, 1999 | Jan. 5, 1999 | 13 |
| A | C | Jan. 12, 1999 | Jan. 5, 1999 | Jan. 5, 1999 | 37 |
| A | B | Jan. 12, 1999 | Jan. 5, 1999 | Jan. 6, 1999 | 24 |
| A | C | Jan. 12, 1999 | Jan. 6, 1999 | Jan. 6, 1999 | 76 |
| A | B | Jan. 12, 1999 | Jan. 7, 1999 | Jan. 7, 1999 | 13 |
| A | C | Jan. 12, 1999 | Jan. 7, 1999 | Jan. 7, 1999 | 37 |

TABLE 6

Final recommended shipments (unlimited stock, not pushing)

| Source | Destination | Need to Ship Date | Available to Ship Date | Scheduled Ship Date (Pushing) | Quantity |
|---|---|---|---|---|---|
| A | B | Jan. 2, 1999 | Jan. 1, 1999 | Jan. 2, 1999 | 50 |
| A | C | Jan. 2, 1999 | Jan. 1, 1999 | Jan. 2, 1999 | 100 |
| A | B | Jan. 4, 1999 | Jan. 1, 1999 | Jan. 4, 1999 | 34 |
| A | C | Jan. 4, 1999 | Jan. 1, 1999 | Jan. 4, 1999 | 66 |
| A | B | Jan. 4, 1999 | Jan. 2, 1999 | Jan. 4, 1999 | 16 |
| A | C | Jan. 4, 1999 | Jan. 2, 1999 | Jan. 4, 1999 | 34 |
| A | B | Jan. 6, 1999 | Jan. 2, 1999 | Jan. 6, 1999 | 50 |
| A | C | Jan. 6, 1999 | Jan. 2, 1999 | Jan. 6, 1999 | 100 |
| A | B | Jan. 8, 1999 | Jan. 3, 1999 | Jan. 8, 1999 | 50 |
| A | C | Jan. 8, 1999 | Jan. 3, 1999 | Jan. 9, 1999 | 100 |
| A | B | Jan. 10, 1999 | Jan. 3, 1999 | Jan. 10, 1999 | 13 |
| A | C | Jan. 10, 1999 | Jan. 3, 1999 | Jan. 10, 1999 | 37 |
| A | B | Jan. 10, 1999 | Jan. 4, 1999 | Jan. 10, 1999 | 24 |
| A | C | Jan. 10, 1999 | Jan. 4, 1999 | Jan. 10, 1999 | 76 |
| A | B | Jan. 10, 1999 | Jan. 5, 1999 | Jan. 10, 1999 | 13 |
| A | C | Jan. 10, 1999 | Jan. 5, 1999 | Jan. 10, 1999 | 37 |
| A | B | Jan. 12, 1999 | Jan. 5, 1999 | Jan. 12, 1999 | 13 |
| A | C | Jan. 12, 1999 | Jan. 5, 1999 | Jan. 12, 1999 | 37 |
| A | B | Jan. 12, 1999 | Jan. 6, 1999 | Jan. 12, 1999 | 24 |
| A | C | Jan. 12, 1999 | Jan. 6, 1999 | Jan. 12, 1999 | 76 |
| A | B | Jan. 12, 1999 | Jan. 7, 1999 | Jan. 12, 1999 | 13 |
| A | C | Jan. 12, 1999 | Jan. 7, 1999 | Jan. 12, 1999 | 37 |

When source stock is not limited and push mode is selected, deployment component 300 generates recommended shipments that satisfy all the demand at the destination over the entire planning duration before it considers any demand at the source, such as customer orders or safety stock.

The user may tell deployment component 300, when source stock is not limited and push mode is selected, to recommend shipments that meet independent demand and safety stock at the source, as well as demand at the destinations, through the minimum allocation duration. With this setting, deployment component 300 considers both source and destination demand equally.

In this embodiment, deployment component 300 covers demand in the following sequence. First, independent demand and safety stock at the source within the minimum allocation duration are covered. Then, the deployment module 300 addresses independent demand and safety stock at the destinations within the minimum allocation durations. Next, all other types of demand, including independent demand and safety stock, at the destinations for the time periods between the minimum allocation durations and the recommend shipments duration, are addressed. Finally, all other types of demand, including independent demand and safety stock, at the destinations for the time periods beyond the recommend shipments duration, but within the planning horizon.

Otherwise, deployment module 300 may cover demand by first addressing independent demand and safety stock at the destinations within the minimum allocation duration and then all types of demand, including independent demand and safety stock, at the destinations for the time periods between the minimum allocation duration and the recommend shipments duration. Next, all types of demand, including independent demand and safety stock, at the destinations for the time periods beyond the recommend shipments duration, but within the planning horizon are addressed. Finally, the deployment module 300 addresses the independent demand and safety stock at the source within the minimum allocation duration.

If stock is limited within the minimum allocation duration, the planning component 210 first determines the location priority level of each destination SKU. For each location priority level, it allocates available stock to cover firm planned arrivals. Next, for each location priority level, the planning component 210 allocates stock to meet demand based on the priority level of each category of demand. Finally, the planning component 210 allocates stock to cover safety stock for all destinations.

Because stock is limited, the Available to Ship Date of at least one recommended shipment will fall after the Need to Ship Date. The priority the user assigns to different demand categories determines how the planning component 210 calculates the Available to Ship Date. Later demand with a higher priority will have an earlier Available to Ship Date than earlier demand with a lower priority.

For recommended shipments generated to meet firm planned arrivals and safety stock, the planning component 210 aggregates, as explained above. For recommended shipments generated to meet an allocation strategy, the planning component 210 aggregates shipments with the same Item, Source, Destination, and Scheduled to Ship Date. These dates have already been adjusted to accommodate the recommended shipments calendar.

Whenever there is coincident demand and there is not enough stock at the source to meet it, the planning component 210 uses Fair-Share Allocation to determine the percentage of the available inventory to allocate to each destination. When the planning component 210 performs fair-share allocation, it uses the calculation shown below. Locations(1 . . . n) are assumed to have the same priority and, in the case of allocation strategy, demand has the same priority for Equation 4.

$$\frac{\text{demand at Loc}(n) \text{ at time}(t)}{\text{total demand at all Locs}(1 \ldots n) \text{at time}(t)} \times \text{remaining stock} \quad \text{(Equation 4)}$$

The planning component 210 includes the source location in the fair-share allocation if there is demand at the source with the same priority as the destination and the source has the same location priority as its destinations. When allocating safety stock, the planning component 210 includes the source location in the fair-share allocation if there is safety stock demand at the source. Location priority is not considered when allocating safety stock.

When stock is limited, the planning component 210 does not wait for enough stock to recommend a complete shipment; it ships what it can as early as it can. As soon as enough stock becomes available within the stock available duration to allow the planning component 210 to recommend a shipment that at least meets the major ship quantity, the planning component 210 recommends a partial shipment. It then retains the unmet demand within the minimum allocation duration. If stock subsequently becomes available within the Stock Available Duration, the unmet demand is the next demand that the planning component 210 processes.

In Table 7, Locations A and B have coincident demand on 1/10, as shown in the first row. The planning component 210 uses fair-share allocation to calculate each destination's portion of the 180 units on hand; it meets 60 of Location A's demand and 120 of Location B's demand with partial shipments, as shown in the second row of the table. The unmet demand (40 for Location A and 80 for Location B) is carried forward.

TABLE 7

Creating partial shipments to meet coincident demand

On Hand: 180

| Demand | Date: 1/10 | Date: 1/10 | Date: 1/11 | Date: 1/11 |
|---|---|---|---|---|
| | Qty: 100 | Qty: 200 | Qty: 50 | Qty: 75 |
| | Loc: A | Loc: B | Loc: A | Loc: B |
| Recommended Shipments | Date: 1/10 | Date: 1/10 | | |
| | Qty: 60 | Qty: 120 | | |
| | Loc: A | Loc: B | | |
| Demand | Date: 1/10 | Date: 1/10 | Date: 1/11 | Date: 1/11 |
| | Qty: 40 | Qty: 80 | Qty: 50 | Qty: 75 |
| | Loc: A | Loc: B | Loc: A | Loc: B |

Since safety stock demand does not accumulate across the periods of the recommended shipments calendar, the planning component 210 retains the balance of unmet safety stock demand only within the period of the recommended shipments calendar that it is working with. After a new period begins, it discards any unmet safety stock demand.

When the planning component 210 performs fair-share allocation to meet coincident demand, it creates a demand list sorted by location in ascending alphabetical order (A-Z). Starting with the first location in the list, it uses fair-share allocation to determine each location's portion of the available stock. If there is unmet demand after the first fair-share allocation, the planning component 210 creates another demand list, this time sorted in the reverse order (descending alphabetical). Beginning with the first location in that list, it performs fair-share allocation. If there is still unmet demand after the second fair-share allocation, the planning component 210 reverses the sort order of the list again (to ascending alphabetical) when it creates the list of unmet demand.

After the planning component 210 allocates stock to each location, it may round the quantity based on the major and minor ship quantities specified for each source/destination pair. The source must have enough stock remaining to equal the smallest major ship quantity of all the locations with coincident demand, or the planning component 210 does not create a recommended shipment. When the planning component 210 recommends shipments, it uses a combination of major ship quantity and minor ship quantity to meet requirements. Major ship quantity is the minimum quantity that the planning component 210 uses when planning recommended shipments to meet requirements—that is, the planning component 210 tries to calculate recommended shipments whose quantity is at least the major ship quantity.

It the planned arrival quantity is less than or equal to major ship quantity, the recommended shipment quantity is major ship quantity. If the planned arrival quantity is greater than major ship quantity, the planning component 210 uses the following equations to determine the recommended shipment quantity:

$$\frac{\text{Planned arrival quantity} - \text{MajorShipQty}}{\text{MinorShipQty}} =$$

Number of MinorShipQuantities

If demand is greater than the major ship quantity, the planning component 210 adds as many minor ship quantities as necessary to meet requirements. If enough stock is available, the planning component 210 rounds the number of minor ship quantities up to the next minor ship quantity. If there is not enough stock available, the planning component 210 adds as many minor ship quantities as it can to meet requirements.

For example, if the planned arrival quantity is 59, major ship quantity is 20, and minor ship quantity is 10, the planning component 210 creates a recommended shipment using one major ship quantity, plus 4 minor ship quantities.

The larger the major and minor ship quantities, the more they can affect the results of the fair-share allocation. Since the planning component 210, and not the user, determines the order in which locations with the same location priority are processed, a large major ship quantity can cause the source to run out of inventory before it can allocate stock to all locations.

The planning component 210 works with five dates when it recommends shipments: available to ship date, needed arrival date, scheduled arrival date, needed shipping date, and scheduled shipping date. The planning component 210 adjusts the dates of all constrained recommended shipments during both limited and unlimited processing. When the planning component 210 adjusts dates, it creates exceptions for planned arrivals and the corresponding recommended shipments generated during unlimited processing.

When the planning component 210 adjusts dates, it follows these steps. First, the planning component 210 sets need to arrive date to the point in time when demand occurs. Since all types of demand, including forecasted demand, start at one minute past OHPost, the need to arrive date will be set to one minute past OH Post or later. Second, set need to ship date to the need to arrive date minus the lead time. Third, set the scheduled ship date to the need to ship date; set the scheduled to arrive date to the need to arrive date. Fourth, determine available to ship date. Fifth, set the scheduled to ship date to the beginning of the recommended shipping calendar period that falls on or after the available to ship date. The schedule to ship date must never be earlier than the available to ship date. Sixth, set the scheduled to arrive date to the scheduled to ship date plus the lead time. Seventh, if pushing, set the scheduled to ship date to the available to ship date. Set the scheduled to arrive date equal to the scheduled ship date plus the lead time. Eighth, adjust the scheduled to ship date if the shipping or receiving calendar is closed on the scheduled date (but do not set the scheduled to ship date earlier than the available to ship date).

EXAMPLE

The following examples show how the planning component 210 creates recommended shipments when source stock is limited within the minimum allocation duration. Assume the following set of planned arrivals in Table 8.

TABLE 8

| Source | Destination | Need to Ship Date | Quantity |
|---|---|---|---|
| A | B | Jan. 1, 1999 | 75 |
| A | C | Jan. 1, 1999 | 100 |
| A | C | Jan. 2, 1999 | 100 |
| A | B | Jan. 3, 1999 | 125 |
| A | C | Jan. 3, 1999 | 100 |
| A | C | Jan. 4, 1999 | 100 |
| A | B | Jan. 5, 1999 | 110 |

TABLE 8-continued

| Source | Destination | Need to Ship Date | Quantity |
|---|---|---|---|
| A | B | Jan. 7, 1999 | 75 |
| A | B | Jan. 9, 1999 | 25 |

These planned arrivals exist to cover the following types of demand in Table 9:

TABLE 9

| Location | Schedule Date | Quantity | Demand Type |
|---|---|---|---|
| B | Jan. 1, 1999 | 75 | nonforecasted customer order |
| C | Jan. 1, 1999 | 100 | forecasted customer order |
| C | Jan. 2, 1999 | 100 | forecasted customer order |
| B | Jan. 3, 1999 | 125 | nonforecasted customer order |
| C | Jan. 3, 1999 | 100 | forecasted customer order |
| C | Jan. 4, 1999 | 100 | forecasted customer order |
| B | Jan. 5, 1999 | 110 | nonforecasted customer order |
| B | Jan. 7, 1999 | 75 | nonforecasted customer order |
| B | Jan. 9, 1999 | 25 | nonforecasted customer order |

Forecasted customer orders and nonforecasted customer orders have the same priority, and Locations B and C have the same location priority. Next, assume the following set of scheduled receipts in Table 10:

TABLE 10

| Location | Schedule Date | Quantity |
|---|---|---|
| A | Jan. 1, 1999 | 100 |
| A | Jan. 2, 1999 | 100 |
| A | Jan. 3, 1999 | 100 |
| A | Jan. 4, 1999 | 100 |
| A | Jan. 5, 1999 | 100 |
| A | Jan. 6, 1999 | 100 |
| A | Jan. 7, 1999 | 100 |
| A | Jan. 8, 1999 | 100 |

Also, assume an on-hand quantity of 0 as of OH Post at source location A. The planning component 210 then generates the interim recommended shipments (before aggregation) shown in Table 11.

TABLE 11

Limited recommended shipments before aggregation

| Source | Dest. | Need to Ship Date | Available to Ship Date | Scheduled Shipment Date (Pushing) | Scheduled Shipment Date (Not Pushing) | Quantity |
|---|---|---|---|---|---|---|
| A | B | Jan. 1, 1999 | Jan. 1, 1999 | Jan. 1, 1999 | Jan. 1, 1999 | 43 |
| A | C | Jan. 1, 1999 | Jan. 1, 1999 | Jan. 1, 1999 | Jan. 1, 1999 | 57 |
| A | B | Jan. 1, 1999 | Jan. 2, 1999 | Jan. 2, 1999 | Jan. 2, 1999 | 32 |
| A | C | Jan. 1, 1999 | Jan. 2, 1999 | Jan. 2, 1999 | Jan. 2, 1999 | 43 |
| A | C | Jan. 2, 1999 | Jan. 2, 1999 | Jan. 2, 1999 | Jan. 2, 1999 | 25 |
| A | C | Jan. 2, 1999 | Jan. 3, 1999 | Jan. 3, 1999 | Jan. 3, 1999 | 75 |
| A | B | Jan. 3, 1999 | Jan. 3, 1999 | Jan. 3, 1999 | Jan. 3, 1999 | 14 |
| A | C | Jan. 3, 1999 | Jan. 3, 1999 | Jan. 3, 1999 | Jan. 3, 1999 | 11 |
| A | B | Jan. 3, 1999 | Jan. 4, 1999 | Jan. 4, 1999 | Jan. 4, 1999 | 56 |
| A | C | Jan. 3, 1999 | Jan. 4, 1999 | Jan. 4, 1999 | Jan. 4, 1999 | 44 |
| A | B | Jan. 3, 1999 | Jan. 5, 1999 | Jan. 5, 1999 | Jan. 5, 1999 | 55 |
| A | C | Jan. 3, 1999 | Jan. 5, 1999 | Jan. 5, 1999 | Jan. 5, 1999 | 45 |
| A | C | Jan. 4, 1999 | Jan. 6, 1999 | Jan. 6, 1999 | Jan. 6, 1999 | 100 |
| A | B | Jan. 5, 1999 | Jan. 7, 1999 | Jan. 7, 1999 | Jan. 7, 1999 | 100 |
| A | B | Jan. 5, 1999 | Jan. 8, 1999 | Jan. 8, 1999 | Jan. 8, 1999 | 10 |
| A | B | Jan. 7, 1999 | Jan. 8, 1999 | Jan. 8, 1999 | Jan. 8, 1999 | 75 |
| A | B | Jan. 9, 1999 | Jan. 8, 1999 | Jan. 8, 1999 | Jan. 9, 1999 | 15 |

After the planning component 210 creates interim recommended shipments, it aggregates them. For recommended shipments generated to meet firm planned arrivals and safety stock, the planning component 210 aggregates shipments to prevent duplicate rows. For recommended shipments generated to meet other demand, the planning component 210 aggregates shipments with the same item, source, destination, and scheduled shipment date. These dates have already been adjusted to accommodate the recommended shipments calendar.

Table 12 shows a final aggregated shipments that the planning component 210 writes to the recommended shipping table. The planning component 210 aggregates the last two recommended shipments to Location B in Table 12 because the available to ship dates are the same.

TABLE 12

Final recommended shipments (limited stock, pushing)

| Source | Dest. | Need Ship Date | ATS Date | Scheduled Shipping Date (Pushing) | Quantity |
|---|---|---|---|---|---|
| A | B | Jan. 1, 1999 | Jan. 1, 1999 | Jan. 1, 1999 | 43 |
| A | C | Jan. 1, 1999 | Jan. 1, 1999 | Jan. 1, 1999 | 57 |
| A | B | Jan. 1, 1999 | Jan. 2, 1999 | Jan. 2, 1999 | 32 |
| A | C | Jan. 1, 1999 | Jan. 2, 1999 | Jan. 2, 1999 | 68 |
| A | C | Jan. 2, 1999 | Jan. 3, 1999 | Jan. 3, 1999 | 86 |
| A | B | Jan. 3, 1999 | Jan. 3, 1999 | Jan. 3, 1999 | 14 |
| A | B | Jan. 3, 1999 | Jan. 4, 1999 | Jan. 4, 1999 | 56 |
| A | B | Jan. 1, 1999 | Jan. 1, 1999 | Jan. 1, 1999 | 43 |
| A | C | Jan. 3, 1999 | Jan. 4, 1999 | Jan. 4, 1999 | 44 |
| A | B | Jan. 3, 1999 | Jan. 5, 1999 | Jan. 5, 1999 | 55 |
| A | C | Jan. 3, 1999 | Jan. 5, 1999 | Jan. 5, 1999 | 45 |
| A | C | Jan. 4, 1999 | Jan. 6, 1999 | Jan. 6, 1999 | 100 |
| A | B | Jan. 5, 1999 | Jan. 7, 1999 | Jan. 7, 1999 | 100 |
| A | B | Jan. 5, 1999 | Jan. 8, 1999 | Jan. 8, 1999 | 100 |

When stock is limited within the minimum allocation duration and dual sourcing is in effect, the planning component 210 have destinations defined in the database 600, whose replenishments come from more than one source. With Dual Sourcing Deployment, when it determines needs by demand type, applies the same percentage split to a destination's on hand as it applies to the destination's demand, ensuring that demand at the destination is not underestimated.

Deployment Component 300

The deployment component 300 may be a tool for the short-term implementation of the results of the planning logic. Horizons may be generally short, and the period over which detailed allocation decisions needed to be made was even shorter.

Deployment component 300 is preferably a tactical tool, requiring longer horizons. If the user company uses the deployment component 300 over a longer horizon, the user may implement the allocation rules specifically designed to accommodate these longer durations.

The deployment component 300 offers the user four deployment logic options. With one option, the deployment component 300 sorts requirements in order by location priority, demand priority, and the need to ship date. With this rule, the deployment component 300 uses the earliest available stock to meet the highest priority demand. The deployment component 300 sorts demand in order by the need to ship date, from earliest (longest lead time) to latest (shortest lead time). It recommends shipments to meet demand for the destination SKU with the earliest need to ship date (or longest lead time) first, followed by the destination with the next earliest NeedShipDate, and so on. If two or more destinations have demand with the same need to ship date (and the same location and demand type priority), and there is not enough stock to meet demand, the deployment component 300 uses a fair-share method to distribute the available stock to all destinations, according to their demand percentages.

Alternatively, the deployment component 300 sorts requirements in order by location priority, demand priority, or need to arrive date. With this rule, the deployment component 300 uses the earliest available stock to meet the highest priority demand. The deployment component 300 sorts demand in order by need to arrive date, rather than need to ship date.

If two or more destinations have demand with the same need to arrive date (and the same location and demand type priority), and there is not enough stock to meet demand, the deployment component 300 uses a fair-share method to distribute the available stock to all destinations, according to their demand percentages. Alternatively, the deployment component 300 sorts requirements in order by demand priority, location priority, and need to ship date.

The deployment component 300 logic uses the latest inventory that becomes available when or before a shipment must be made to meet the highest priority demand. The deployment component 300 allocates inventory to locations with planned arrivals whose NeedShipDates fall within the minimum allocation duration, according to the priority of the demand that these arrivals are intended to cover.

If inventory is inadequate to meet the requirements on a given shipping day, the deployment component 300 uses a fair-share method to distribute stock among coincident demands. Coincident demands are planned shipments with the same need to ship date. The deployment component 300 rounds fair-share values, and shortages are made up as inventory becomes available. Alternatively, the deployment component 300 sorts requirements in order by demand priority based on the allocation strategy assigned to the SKU, location priority, and need to arrive date.

Temporary shortages within the stock available duration can occur frequently, especially for clients using constrained production planning. If the planning component 210 selects one of the first two, the deployment component 300 invokes allocation logic whenever it encounters a shortage, even when the shortage can be alleviated by subsequent replenishments. Alternatively, with long duration rules (last two), the deployment component 300 handles this situation by interpreting the minimum allocation duration differently. The deployment component 300 determines available inventory through the stock availability duration. The stock availability duration is not limited to the minimum allocation duration.

With relatively short-term rules, the deployment component 300 uses the earliest available stock to meet the highest priority demand, without regard to whether subsequent replenishments can be used to meet demand in a timely manner. Lower priority demands may not be met if the stock that could be used to meet them is already reserved for the higher priority demand. This can be particularly true for safety stock. Alternatively, the deployment component 300 logic with last two rules uses the inventory that becomes available latest on or before the date on which the shipment must be made. If inventory is inadequate to meet the requirements on a given shipping day, the deployment component 300 fairshares the amount available among the coincident demands. Likewise, with the first two rules, the deployment component 300 meets all demands at the highest priority location before it meets demands at any lower priority locations.

Whereas, with deployment logic for the section two rules, demand priority takes precedence over location priority. The deployment component 300 meets the highest priority demand at the highest priority location, followed by the highest priority demand at the second highest priority location, and so on. This method makes it more likely that the deployment component 300 will be able to meet higher priority demands at all locations.

If source inventory is inadequate to meet requirements at some point before the minimum allocation duration, the deployment component 300 uses allocation processing. The deployment component 300 allocates available inventory to locations, including the source. After allocating inventory based on location priority, the deployment component 300 allocates based on the allocation strategy.

In another embodiment, the dynamic deployment component 211 is an option in the Planning that provides an alternative method for generating recommended shipments that can be used to resolve shortages. Dynamic deployment component 211 resolves shortages at destination SKUs by generating recommended shipments from possible sources for the lowest cost. Optionally, the optimization algorithm used by dynamic deployment component 211 can be instructed to ship on existing lanes whenever feasible, or to find alternate sources with the lowest restocking cost that are as close as possible to the location being replenished.

First, the user defines the sources for dynamic deployment component 211 to consider when it resolves shortages at destination SKUs. Dynamic deployment component 211 builds a model of the user distribution network using all the sources for a particular destination Y. When a destination location has a shortage, dynamic deployment component 211 resolves it by moving inventory from sources with a surplus for the lowest cost.

Dynamic deployment component 211 determines which locations have surplus inventory and which have a shortage. Dynamic deployment component 211 calculates shortage quantities for a location using the dynamic deployment component 211 Safety Stock Factor (safety stock factor) and dynamic deployment component 211 and Shortage Duration (shortage duration). Dynamic deployment component 211 calculates the minimum level of safety stock that needs to be maintained at a location. Dynamic deployment component 211 recognizes that a location has a shortage when on hand inventory falls below minimum safety stock, and on hand remains below minimum safety stock for longer than the Shortage Duration.

Dynamic deployment component 211 attempts to generate recommended shipments whose quantities will restore the location's on hand to a level at or above minimum safety stock. Shortage is calculated as a daily instantaneous value at the latest time the location is open for receiving, based on the destination calendar. Dynamic deployment component 211 determines the minimum level of safety stock that must be maintained at a location. Surplus is the incremental quantity of product that can be removed from a location without reducing the on hand below the minimum safety stock level at any time within the dynamic deployment component 211 horizon, as described below. Surplus is calculated as a daily instantaneous value at the first minute of the day. Recommended shipment quantities are subtracted out.

The goal of dynamic deployment component 211 is to move product from sources with a surplus to destinations with shortages for the lowest cost. The user can run dynamic deployment component 211 based only on transportation costs, or the user can set values in the database 600 to tell dynamic deployment component 211 to also consider the costs of stocking out or restocking a location.

To calculate the total cost of shipping one unit of product from one location to another, dynamic deployment component 211 looks to the cost of shipping one unit of product from one location to another using a specific transportation mode, the initial cost per unit of a stock shortage at a location, the cost of product arriving late, the cost per unit of restocking a location when its surplus inventory is used to resolve a shortage, and the cost of creating a load on a new lane.

The user also defines several properties for dynamic deployment component 211. For instance, the user may define a dynamic deployment component 211 duration that specifies the period of time during which dynamic deployment component 211 resolves deployment exceptions. The duration the user specify, added to OH Post, defines the dynamic deployment component 211 horizon. The user can define either a dynamic deployment component 211 duration or a stock available duration, or both instead. For destination SKUs, the user also can specify a dynamic deployment component 211 duration. Similarly, a user may define a dynamic deployment component 211 new lane penalty that controls the additional transportation cost assessed to create a load on a new lane.

In one embodiment, the user may select whether dynamic deployment component 211 considers it preferable to hold stock at the source locations, rather than the destinations, or vice versa. In other embodiments, the user may specify preferences in the dynamic deployment component 211 corporate 211. For instance, if there is an overall shortage in an item family, dynamic deployment component 211 may meet later shortages early instead of meeting earlier shortages even one day late.

Similarly, if there is an overall shortage in an item family, dynamic deployment component 211 may meet shortages with longer durations (earlier) over shortages with shorter durations (later), regardless of whether the shortages are met on time or late.

The automated load builder 310 recommended shipments into feasible vehicle loads, based on a solution strategy that the user specify. The user can then review and revise these loads.

To create and manage vehicle loads, the automatic load builder 310 uses the following data, which are generally contained or transferred to the database 600. One key fact is the earliest date on which a recommended shipment is allowed to arrive at a destination. If the destination location is closed on the earliest arrival date, the system 100 adjusts the date to the location's prior open time. Another key fact is the starting date of the load, as specified by the user.

The automatic load builder 310 also looks to load tolerance, which is a percentage used to determine when a load is full. A load is full when the mode of transportation is filled to capacity, plus or minus the load tolerance.

"Look Ahead Days" are the number of days that a recommended shipment is allowed to be delivered prior to its need to arrive date. The users specify a value for look ahead days or the automated load builder 310 uses a default value.

A "Look Ahead Shipment" is a recommended shipment that, when pulled forward and added to a load, will arrive at the destination prior to its deeded arrival date, but not earlier than its earliest arrival date.

Must Go Days is the number of days that automated load builder 310 uses to define a period of time, from the dispatch date, during which recommended shipments must leave the source in order to arrive at the destination by the needed arrive date. The user specifies a value for must go days or the automated load builder 310 uses a default value.

A Must Go Shipment is a recommended shipment whose needed ship date falls within the must go window then, the automated load builder 310 includes at least one must go shipment on every load it creates.

The Must Go Window is a period of time that is defined by adding the Must Go Days to the Dispatch Date.

A Needed Arrive Date is the date when a shipment is needed at the destination.

A Needed Ship Date is the latest date that the recommended shipment must be shipped in order to arrive at the destination location by the needed arrive date.

A recommended shipment is said to be pulled forward when, by adding it to a load, it will arrive at the destination prior to its needed arrive date.

The following sections contain information on the tasks that the user needs to perform before the system can generate vehicle loads.

Unlike allocation and recommended shipments calendars, which are defined by SKU, calendars for the automated load builder 310 are defined by location. The automated load builder 310 is used in source and destination calendars to determine when locations are open for shipping and receiving.

The source calendar determines when a source location is open for shipping. Based on the source calendar the user defines, the automated load builder 310 adjusts the needed ship date if it falls on a date when the source location is closed.

The determination calendar determines when a destination location is open to receive a load. If the earliest arrival date falls on a date when the destination location is closed, the automated load builder 310 adjusts the date to the next earliest date that the location is open.

Before the user generate vehicle loads, the user must define a solution strategy that automated load builder 310 will use when it builds loads. This strategy determines which recommended shipments must be included in a load, establishes the criteria for determining when a load is full, limits how early recommended shipments can arrive at a destination, and sets the priority for adding recommended shipments to a partially filled load.

A "must go" shipment is a recommended shipment that must leave the source within the must go days in order to be delivered at the destination on the needed arrive date.

The system adds the "must go days" to the dispatch date to define a time window. Shipments whose needed ship date falls within this window are considered to be must go shipments. The automated load builder 310 generally includes at least one must go shipment on every load that it creates. If none of the recommended shipments between a source and destination qualifies as a must go shipment, the automated load builder 310 cannot generate a load for that source/destination pair and processing terminates.

The first recommended shipment that automated load builder 310 adds to a load is a must go shipment. Subsequent recommended shipments added to the load may or may not be must go shipments, depending on how much weight the user solution strategy places on the must go reward.

The user also can tell the automated load builder 310 to use the Scheduled Arrival Date instead of the needed arrival date to determine the date on which a shipment must be delivered at a destination.

A load tolerance option on the automated load builder 310 may define a percentage that automated load builder 310 uses to determine when a load is full. A load is full when the mode of transportation is filled to capacity, plus or minus the percentage the user specifies. A transportation mode's capacity can be measured in weight, volume, pallets, and cases. A load is considered full if the load tolerance percentage is met in at least one of these measures.

In trying to build complete loads, the automated load builder 310 may add recommended shipments to the load whose Needed Arrival Date falls after the load is scheduled to arrive at the destination. The earliest date that a recommended shipment is allowed to arrive at a destination is determined by the Look Ahead Days parameter. Look Ahead Days specifies the number of days prior to its NeedArrivDate that a recommended shipment can be delivered. Automated load builder 310 calculates the earliest arrival date for a recommended shipment as NeedArrivDate minus Look Ahead Days.

Alternatively, the user can tell automated load builder 310 to use the Scheduled Arrival Date instead of the needed arrival date to determine the date on which a shipment must arrive at a destination.

When the automated load builder 310 builds a load, the first recommended shipment it adds to the load is a must go shipment. It then completes the load by adding additional recommended shipments.

Five options on the automated load builder 310 dialog allow the user to define the priority for adding shipments to a partially filled load. Each of these options has either a reward or penalty associated with it. The user assigns a value to each, based on the importance of a particular option to the user company's load building objectives. The automated load builder 310 calculates a priority value for each recommended shipment between the source and destination it is working with by adding values for rewards and subtracting values for penalties. The recommended shipment having the highest value is added to the load first, followed by the next highest value, and so on.

The user sets priorities by entering values associated with several costs, including a "Pull ahead" penalty imposing a penalty for each day that a recommended shipment is pulled forward if it is added to a load; a "same item" reward representing benefits from an item that is already on the load; a "split penalty" imposing a penalty on a recommended shipment that must be split in order to add it to a load; a "not full penalty" that imposes a penalty on a recommended shipment that, when added to a load, does not fill the load completely; and a "must go" reward to reward a must go shipment. Some of these options can conflict, depending on how they are set. For example, a recommended shipment may be penalized for being pulled forward by one day, but then rewarded for being an item that is already on the load. To determine how to set these options so that they best meet the user company's objectives, the user might want to start out by setting them all to zero, then setting values for one or two at a time and analyzing the results.

To complete a load, the automated load builder 310 adds recommended shipments one at a time. To determine the order in which recommended shipments are added, a priority value is calculated for each recommended shipment based on the reward and penalty factors. The automated load builder 310 sorts recommended shipments by priority, from highest to lowest. The recommended shipment with the highest priority is added to the load first. Every time the automated load builder 310 adds a shipment to a load, it automatically recalculates priority values and resorts recommended shipments by priority. Reprioritizing the shipments optimizes the load, since the priorities guide the algorithm into generating better quality loads. Alternatively, the user can tell the automated load builder 310 not to recalculate priority values every time, but just to use the values it calculated the first time.

The automated load builder 310 builds loads using the transportation mode(s) defined for the source and destination. The user can define alternate transportation modes for the automated load builder 310 to use in the event it cannot fill the load using the primary or preferred transportation mode.

When the automated load builder 310 builds a load, it first tries to fill it using the preferred transportation mode. If it cannot fill the load using the preferred mode, it tries to fill the load using the mode with the next highest rank. If it cannot fill the load using any of the transportation modes specified for the source and destination it is working with, it selects the mode with the best fill (based on the Load Tolerance). For instance, light loads may go by airmail.

A recommended shipment may qualify as a must go shipment with one transportation mode and not with another. This is because the transportation lead times between transportation modes may differ, causing the needed ship date of a recommended shipment to fall on a different day.

The automated load builder 310 finds the optimal load configuration by attempting to place all recommended shipments on all available alternate carriers. This behavior assumes that all transportation modes are interchangeable. If transportation modes are not interchangeable (truck and rail, for example), the automated load builder 310 uses only the defined modes of transportation it builds loads and does not consider any alternatives.

With the automated load builder 310, the user can simulate what the industry refers to as a "Double Pup" transportation mode by defining two trailers for a transportation mode. Automated load builder 310 creates two separate loads instead of one for a transportation mode with two trailers. Each load is written to the database 600 as a separate record.

Both loads must adhere to the load tolerance the user specifies. For example, if the user specifies a load tolerance of plus or minus 2 percent, then each load must be at least 98 percent full. The automated load builder 310 will not create one load at 100 percent full and the other at 96 percent full. If automated load builder 310 cannot fill both loads to capacity plus or minus the load tolerance, it goes to the next highest ranked transportation mode.

In another embodiment, the user can tell the automated load builder 310 to take carrier weekend travel patterns into account when it calculates the ship date of a load. The automated load builder 310 generates vehicle loads from the recommended shipments between one source and destination at a time. For each source and destination that it works with, it follows these following steps.

First, the automated load builder 310 selects target recommended shipments to start the load, sorts recommended shipments according to needed arrival date, and selects a target recommended shipment. The target recommended shipment is a must go shipment with the earliest Need Arrival Date that has some quantity that has not already been assigned to a load. (Must go shipments with later needed arrive dates become candidate shipments for the load. Next, the automated load builder 310 selects the preferred transportation mode for the recommended shipment. Then, the automated load builder 310 creates a load using the selected transportation mode. The load will be empty to begin with. The automated load builder next adds target recommended shipment to load. For the set of recommended shipments between the source and destination, the automated load builder 310 determines which recommended shipments are candidates to add to the load. A recommended shipment is a candidate if it is a look-ahead shipment with some quantity remaining that has not been added to a load. Subsequently, the automated load builder 310 calculates priority values for all the candidate recommended shipments and assigns priority values.

The automated load builder 310 adds shipments to load, by selecting the shipment with the highest priority, adding that shipment to the load, and continuing to add shipments to the load in order by priority, until there are no more shipments that can be added to the load. Next, the automated load builder 310 tests whether the load is full. If the load is full, the automated load builder 310 commits the load and goes to create the next load.

If the load is not full, the automated load builder 310 determines whether the current transportation mode has the best fill percentage so far. If it does, the automated load builder 310 stores it in case there are no other transportation modes to complete the load.

The automated load builder 310 checks for alternate transportation modes, and specifically, the automated load builder 310 checks the Network for alternate transportation modes, and if no alternate transportation modes are defined, the automated load builder 310 commits the best load and assigns a not full status.

If alternate transportation modes are defined, the automated load builder 310 determines fill percentage for current transportation mode by finding the next highest ranking transportation mode and try to fill the load. If the load is full, the automated load builder 310 commits it and starts forming a new mode. If the load cannot be filled using that mode, the automated load builder 310 tries the transportation mode with the next highest rank and continues to try alternate transportation modes, in order by rank.

When a transportation mode is found that fills the load, the automated load builder 310 commits the load and starts creating a new load.

If there are no more transportation modes defined and the load is not full, the automated load builder 310 selects a transportation mode with best fill percentage. After the automated load builder 310 creates a load, it subtracts the quantity of the recommended shipment that it used in the load from the unused recommended shipment quantities.

Load Manager 320

After automated load builder 310 has created vehicle loads, the user can review and revise them using the Load Manager 320. The user also can use Load Manager to manually create vehicle loads and fill them with recommended shipments.

Load Manager allows the user to select data by SKU, item, or location. Using that data selection, it retrieves data from the database 600 using two different selection keys SKU or location. To access two incompatible datasets, using a single data selection, Load Manager 320 converts the user data selection to one that it can use for both tables.

The system 100 determines the source and destination locations the user wants to work with based on the user data selection. It displays all the lanes for those sources and destinations: a lane is a combination of source, destination, and transportation mode. The user may select the lanes she wants to work with. Also, the user can work with multiple lanes for the same source and destination.

The distribution of date-sensitive inventory introduced the concepts related to the distribution of perishable items and presented the steps necessary for calculating a replenishment of the planning component 210 for that inventory were outlined. Deployment of inventory differs from the distribution of inventory in that distribution determines the requirements and deployment attempts to meet them. Consequently, when planning component 210 generates planned arrivals, it schedules replenishments to support those requirements. Deployment logic, on the other hand, must find the inventory to meet the requirements.

To understand the concepts and the considerations that must be made in deploying products that have a limited usable life span, a new term specific to date-sensitive inventory is now introduced.

"Minimum shelf life tolerance" is a term specific to the deployment of date-sensitive inventory. It is the allowable variance that can be tolerated within the minimum shelf life duration. For example, if the minimum shelf life for an item is 7 days, and the tolerance is 1 day, a requirement can be met with inventory that has a shelf life of only 6 days.

The planning component 210 generates recommended shipments for date-sensitive inventory in either constrained or unconstrained mode. If the mode for a date-sensitive SKU is unconstrained, the planning component 210 uses standard deployment logic to convert the planned shipment into a recommended shipment while at the same time preserving the expiration date. If the mode is constrained, however, the planning component 210 uses logic specific to inventory with a limited shelf life. This section discusses how the planning component 210 process generates recommended shipments for constrained, date-sensitive SKUs.

The first thing that the planning component 210 does in the process of recommending shipments is to determine the supply that it has to work with. To ascertain the supply, the planning component 210 must have the following information for existing inventory and usable replenishments:

1. Available date—the first date on which the inventory can be shipped;
2. Expiration date—the date on which the inventory cannot be used for any purpose; and
3. Quantity or the existing amount of inventory.

The planning component 210 sorts this list by available date and expiration date from earliest to latest. The replenishments fall into two categories according to their dates of availability. If the stock available duration is zero, the replenishments are available on or before on-hand post. If the stock available duration is greater than zero, then the types or replenishments included are those that are available on or before the end of the stock available horizon (on-hand post plus the stock available duration). These types include scheduled receipts that are available on or before the end of the stock available horizon, intransits that are available on or before the end of the stock available horizon, recommended arrivals that arrive on or before the end of the stock available horizon, and planned orders that are available on or before the end of the stock available horizon. The expiration date for scheduled receipts, planned orders, recommended arrivals, and intransits are already part of the data, in the database 600.

Before it can meet distribution demand, the planning component 210 must account for inventory that has already been committed, i.e., outbound intransits and firm planned shipments. This means that the planning component 210 should:

For outbound intransits, cover the requirements for (quantities at the source that are on-hand and have not shipped), and (quantities at the source that are still included in the on-hand inventory, but the load has shipped) to ensure that the on-hand inventory actually exists for firm planned shipments, the planning component 210 must create recommended shipments to meet these firm planned shipments.

In the case of the intransits if the planning component 210 can find inventory that matches the expiration date of an intransit and is available on or before the intransit is scheduled to ship, then it draws from this inventory to meet the requirement. Otherwise, if the planning component 210 cannot find an appropriate match, it must use inventory that expires later than the expiration date on the intransit and is available on or before the intransit is scheduled to ship.

If the planning component 210 still can not match up its inventory, then there is probably an error in the status codes of the intransits. In this case, an exception is flagged to indicate that requirements for outbound intransits could not be met. The planning component 210 would then reduce the freshest available inventory until the intransits had been met or there was no inventory remaining. For firm planned shipments with a limited shelf life, the expiration date information is considered using date-sensitive inventory logic.

To determine requirements, the planning component 210 separates destination demand and demand from the source, and lists the information needed for recommending shipments. For destination demand, the planning component 210 uses all of the planned shipments with scheduled dates that fall within the recommended shipment horizon (on-hand post plus the recommended shipment duration). The list includes the destination location. This is the shipment quantity rounded by the major and minor quantities in the database 600, the scheduled ship date of the planned shipment, the expiration date of the planned arrival, and tolerated date, which is the expiration date of the planned arrival less the minimum shelf life tolerance duration.

For demand from the source, the planning component 210 uses customer orders at the source, dependent demand, and forecast. The customer order and dependent demand data includes: the source location, the quantity needed for the order, the scheduled ship date of the customer order or the date that the dependent demand occurs, the expiration date which is the scheduled ship date plus the minimum shelf life of the source SKU, and the tolerated date which is the expiration date of the planned arrival minus the minimum shelf life.

Since forecast information takes the form of a continuous curve, the planning component 210 breaks it up in order to assign expiration dates to the demand. To do this, the planning component 210 uses the source's recommended shipments calendar. The planning component 210 separates the forecast into buckets defined by the calendar. It then adds the slotted forecast to the list. Forecast list includes source location, the quantity is forecast that falls within the calendar bucket, the scheduled ship date as the beginning of the period defined by the bucket, the expiration date as the end of the period defined by the bucket plus the minimum shelf life of the source SKU, and the tolerated date as the expiration date less the minimum shelf life. This list should be sorted by the scheduled ship date and the expiration date, from earliest to latest.

In the next step, the planning component 210 must determine if there is enough inventory to meet the demand and if the inventory meets freshness requirements. To do this, the planning component 210 compares the scheduled ship dates and required expiration dates for demand that falls within the minimum allocation horizon to the available dates and expiration dates on the supply side. If the planning component 210 encounters a situation where there is enough inventory, but it is not fresh enough to meet the demand expiration date requirement, it compares the supply expiration date to the demand tolerated date instead. If the demand can be met using the tolerated date, the planning component 210 considers the demand to be met with an exception.

Otherwise, if a demand cannot be met on time within the minimum allocation horizon, and if tolerated freshness requirements cannot be met, then there exists a limited inventory condition. In other words, the planning component 210 must still collapse the requirements within the minimum allocation horizon to their component demands to determine the allocation priorities.

There is a limited inventory condition and detailed requirements should be developed. If the inventory is not limited, the initial requirement list is adequate to develop the recommended shipments.

Detailed requirements for the source location were developed as described above. Similar information must be developed for the destinations. To do this, the planning component 210 must determine what demands are covered by which planned arrivals for each planned arrival that is scheduled to ship within the minimum allocation horizon. The planning component 210 generally uses the same allocation rules described above.

However, since more detail is needed on the destination's forecast data than would be provided by simply looking at the coverage duration, the planning component 210 uses deployment logic to slot the forecast data into the sources recommended on the shipment calendar. Also, the planning component 210 assigns expiration dates and tolerance dates to each of the destination's detailed requirements.

Because the freshness of the product must be considered, the planning component 210 needs to prioritize the requirements regardless of whether or not the condition of the user inventory is limited. The user may want to send the fresher product out to higher priority locations, when possible. Clearly, requirements must be prioritized when there is a limited inventory condition, since this determines how the available inventory is allocated.

Currently, there are several possible recommended shipment allocation rules. The system may always ship the earliest available, usable supply to the highest priority demand at the highest priority locations, based on when the inventory is scheduled to ship. Alternately, the system 100 may always ships the earliest available, usable supply to the highest priority demand at the highest priority locations, based on when the inventory needs to arrive. Otherwise, when inventory is not limited and does not utilize the freshness tolerance, the system 100 may ship the earliest available usable supply to the lowest priority locations first, thus saving the fresher product for the higher priority locations.

Consequently, the planning component 210 has four possible ways of sorting the detailed requirements list. If the inventory is limited or the freshness tolerance option is used, the planning component 210 sorts the detailed requirements list in order by scheduled ship date, location priority, demand priority, and expiration date. If the inventory is limited or the freshness tolerance option is used, the planning component 210 may sort the detailed requirements list in order by needed arrival date, location priority, demand priority, or expiration date. If the inventory is not limited and the freshness tolerance option is not used, the planning component 210 sorts the detailed requirements list in order by scheduled ship date, descending location priority, and expiration date. If inventory is not limited and freshness tolerance option is not used, the planning component 210 may sort the detailed requirements list in order by needed arrival date, descending location priority, and expiration date.

When requirements have been prioritized, the planning component 210 can generate recommended shipments to meet them. The planning component 210 attempts to meet each requirement in the detailed requirements list in order, using inventory with earliest available dates that fall on or before the scheduled ship date and the earliest expiration dates that fall on or after the required expiration date. If the planning component 210 cannot find all the inventory available on or before the scheduled ship date and has expiration dates that fall after the required expiration date, it uses the tolerance date of the requirement instead of the expiration date as the guideline for inventory to use. If the planning component 210 still cannot find inventory that is available on time and is fresh enough to meet the tolerance requirement, then it tries to meet the requirement using inventory that is available later. If, however, the demand type of the requirement is one that is allowed to be ignored by the destination's demand reduction strategy, this unmet requirement is removed from the list.

If there are matching location priorities, demand priorities, scheduled ship dates, and need ship dates on two or more requirements, the planning component 210 considers this to be a coincident demand. If the supply that the planning component 210 uses to meet these requirements is less than the sum of the requirements, the inventory is allocated based on the location's portion of the total requirement.

If there are multiple entries from the same location with matching demand priorities, schedule ship dates, and need ship dates, then the planning component 210 combines these into a single requirement for allocation purposes, reducing the portions it can ignore on subsequent allocations, as mentioned above.

In the deployment component 300 of fulfillment system 100, the user can specify potential alternates, or substitutes, for an item, and tell deployment to automatically ship the substitute when inventory of the original item runs out. This feature is particularly useful for modeling promotions that involve items with multiple design variations and limited supply that are switched according to a predetermined schedule. For example, suppose an item is part of a promotion that lasts for four weeks. After the four weeks is over, the first item is no longer available and a different promotional item is scheduled to be used instead. If there is enough inventory of the first item to cover all four weeks of the promotion, the items can be switched as scheduled. But what happens if the first item runs out before the scheduled switchover? With the alternate items feature, the next scheduled item is automatically shipped instead.

To implement the alternate items feature into the user database, the user needs to set up substitution relationships for each item for which the user wants deployment module 330 to use substitutes. Specifically, the user defines an item and specifies a list of substitutes for that item, discontinue and effective dates determining the time period during which the item can be used as a substitute, substitution preference and a substitution logic.

The following example in Table 13 shows a sample substitution list. This example models a holiday promotion for a warehouse store that is giving out free chocolate Santas (Item 100-00-0000) with any purchase of $10.00 or more. The promotional chocolate Santa is one ounce of milk chocolate, wrapped in red and green foil. Additional items that represent design variations of the promotional Santa—different types of chocolate and different colored foil wrapping—also exist. Since it is anticipated that stores could run out of the promotional chocolate Santas prior to the end of the promotion, these design variations have been defined as substitute items.

TABLE 13

Substitution list defined for the Santa promotion

| Item | Substitute | Description | Priority | Eff. Date | Disc. Date | Draw Quantity |
|---|---|---|---|---|---|---|
| 100-00-0000 | 100-00-0001 | 1-oz. milk choc grn/blue foil Santa | 1 | Nov. 26, 1999 | Dec. 26, 1999 | 1.0 |
| 100-00-0000 | 100-00-0002 | 1-oz. dark choc red/grn foil Santa | 2 | Nov. 26, 1999 | Dec. 26, 1999 | 1.0 |
| 100-00-0000 | 100-00-0003 | 1-oz. dark choc grn/blue foil Santa | 3 | Nov. 26, 1999 | Dec. 26, 1999 | 1.0 |
| 100-00-0000 | 100-00-0004 | 1-oz. white choc red/grn foil Santa | 4 | Nov. 26, 1999 | Dec. 26, 1999 | 1.0 |
| 100-00-0000 | 100-00-0005 | 1-oz. white choc grn/blue foil Santa | 5 | Nov. 26, 1999 | Dec. 26, 1999 | 1.0 |
| 100-00-0000 | 200-00-0001 | 1-oz. milk choc red/brwn foil turkey | 6 | Nov. 26, 1999 | Dec. 26, 1999 | 1.0 |

The substitution list in Table 13 tells the system to use 100-00-0001 if there is not enough 100-00-0000 to meet the demand. The list then tells the system to use 100-00-0002 if it is unable to use 100-00-0001 to fulfill the unmet requirements of 100-00-0000, and so on. Note that the Priority 6 substitution uses a different item to allow the substitution of unused inventory from prior promotions.

Substitution logic is included as part of the planning component 210 process. Since substitute items have their own requirements (and cannot be used as substitutes until their requirements have been met), the planning component 210 uses substitution logic after normal planning and deployment logic have been performed. In addition, since it is possible that a location could meet all of the requirements for a given item by receiving a shipment from a location other than its normal source, the planning component 210 also executes dynamic deployment prior to running substitution logic.

Once planning, deployment, and dynamic deployment logic have executed, substitution logic can determine how much demand needs to be met by substitute SKUs and the amount of inventory available to meet that demand. The demand of the primary SKU that the substitute SKUs need to meet is the difference between the demand for the primary SKU (planned arrivals) and the supply of the primary SKU (recommended arrivals). The primary SKU is an item with demand that may be satisfied using another item. The supply that a substitute SKU has available to cover the unmet requirements of the primary SKU is the excess inventory of the substitute SKU after meeting its requirements. If a substitute SKU does not have excess inventory, substitution logic rejects it as a substitute and uses the next priority substitute specified by the user.

Substitution logic needs to know which SKUs need additional inventory. Also, since a substitute item might be used to cover the demands of several unrelated items, substitution logic needs to make sure that items with the greatest need receive substitute inventory before items with lesser need. To determine which SKUs need supplemental shipments and the order in which they should be processed, substitution logic uses information in the database 600.

The user may choose different rules for determining which items receive substitute inventory first. For instance, items with the largest shortage quantity may receive substitute inventory first. Alternatively, items with the longest shortage duration may receive substitute inventory first. Alternatively, items with the earliest date of shortage may receive substitute inventory first.

If there is not enough inventory to cover all of the primary SKU's unmet demands, substitution logic may use substitute items to meet the demand. Unlike normal deployment logic, which uses an allocation strategy to prioritize demand types, substitution logic allocates the substitute's excess inventory based on the total quantity of the unmet planned arrival. It does not consider which types of demand are unmet at the destination. Likewise, substitution logic may consider demands that are met late to be unmet.

Substitution logic determines which items can be used as substitutes. Demands are passed on to less preferable substitutes until either all demands are met or all substitutes have been used. Since substitutes are defined at an item level, substitutions are considered from the source's perspective—that is, the source dictates which SKUs are shipped to meet unmet demand, rather than the destination "asking" for a certain substitute. The system 100 allows the user to track when substitution logic has recommended shipments of substitute items to meet the demand of the primary item.

Production Module 400

The production component 400 is an early warning system that gives the user time to smooth out the expensive peaks and valleys in the user production schedule. With the long-range view provided by the production component 400, the user has time to build up inventory, increase capacity, or take other measures to avoid periods of resource overload or underuse. The production component 400 enables the user to quickly evaluate alternative plans by focusing on exceptions, not details.

The production component 400 begins with a master production planning component 210 (planned orders) produced by planning component 210. The master production planning component 210 meets all demand, but it may not be feasible because it overloads resources. The production component 400 improves the master production planning component 210 by shifting resource load from overloaded periods to other periods (or to other resources through the use of alternative production methods). It also allows the user to shift load to other resources or other locations where there is excess capacity.

In one embodiment, the production component 400 includes a load leveler 410 that automatically levels loads, using strategies and rules the user has specified to smooth the peaks and valleys in the master production plan. It levels loads by moving planned orders to other periods on the resource or, by using alternative production methods, to another resource at the same location. The user can use the load leveler 410 at any time after planned orders have been created. The user can run load leveler 410 in batch—immediately after Plan, for example. In this way, the production component 400 can recommend solutions that better avoid imbalanced inventory levels.

Another embodiment of the production component 400 includes a tool kit 420 that allows the user to manually fine-tune the plan. The user can move load on a resource to an earlier or later period. The user may want to move loads from one resource to another at the same plant. If necessary, the user can shift production from an overloaded resource at one plant to a resource with excess capacity at another plant. Also, the user may create intentional imbalance, such as increasing inventory levels before holidays.

Preferably, the user sets up the database 600 in a specific order, because data in certain locations may rely on data located at other locations. For more information on forming the database 600, please refer to co-owned applications U.S. Ser. No. 60/264321 for "system and method for allocating the supply of critical material components and manufacturing capacity." For instance, the user may group SKUs into a family to enable the user and the system to manipulate loads for many SKUs at once instead of working with one at a time.

As described above, load leveler 410 automatically levels the loads in a master production plan. Using strategies defined by the user, the load leveler 410 tries to eliminate all resource overloads within the planning horizon by moving excess load to another time period, another production method, or another location, or by deleting the excess load. The data selections for load leveler 410 should include all resources whose loads the user wants to level.

Data selections also may include additional resources if the user wants the system to simultaneously apply constraints to all resources. That is, the user may include resources that are not to be leveled but that are used by production methods that also use the resources that are being leveled. The load leveler 410 will not violate the constraints on those resources. If moving a load would result in a move that would violate a constraint on any currently selected resource, the original move will not be made.

The load leveler 410 calculates existing load that results from planned orders and scheduled receipts. To determine the initial value of planned order load in each period on each resource, the load leveler 410 must determine which resource is used for each existing planned order. For planned orders using resources whose load is being leveled, the system must determine when the planned order will place load on the resource.

To determine the scheduled receipts load on a resource, the system includes all scheduled receipts for SKUs whose preferred production method uses that resource and whose date of use falls within the planning horizon.

The user also may designate whether scheduled receipts are included when calculating the load on a production resource. The system 100 then assumes that all scheduled receipts represent production.

Alternatively, the production component 400 does not include scheduled receipts when it calculates the load on a production resource. This setting allows the user to use scheduled receipts to model items that do not place a load on a production resource—for example, purchased items or product inventory, such as wine or cheese, that have been set aside for aging.

To level the loads on selected resources, load leveler 410 first determines which selected resources are to be leveled. The load leveler 410 then determines the sequence in which those resources will be leveled, based on the preferences provided by the user. The load leveler 410 then, starting with the first resource, applies a specified strategy. The system 100 works with one resource at a time to complete the remainder of these procedures for one resource before processing the next resource. Next, the load leveler 410 applies each step in the strategy until there are no more overloads on the resource or until the last step has been applied. Next, the load leveler 410, for each step, determines whether loads are to be leveled by SKU or by family starting at either the first or the last period in the planning horizon and scanning the master production planning component 210 until the first overloaded period is found. Next, the load leveler 410, for each overloaded period in which more than one SKU or family has planned orders, determines the sequence in which to process SKUs or families in an effort to remove the excess load. Next, the load leveler 410, starting with the first SKU or family, tries to remove the overload and determines how many times to try moving the load for each SKU or family. Next, the load leveler 410 after the maximum number of tries (or after the load has been moved to the end of the planning horizon), and if the resource is still overloaded, processes the next SKU or family. The new planned orders rule, load offset duration, production calendar, and planned order schedule dates interact to determine the date/time for planned order quantities that are moved. Next, the load leveler 410, if load was moved to a different plant, creates firm planned arrivals from the new plant. Next, the load leveler 410 when there is no more overload in the period or when all SKUs or families have been processed, finds the next overloaded period and attempts to address the overload. After the load leveler 410 attempts to address overloads in all periods, it next attempts to level the next resource.

In the constrained production planning module (CPP) 430 in the production component 400, a load offset duration indicates the duration in calendar days between the point in time when the load is placed on a critical resource in the manufacture of a given planned order, and the point in time when that planned order is considered available to ship. Load offset duration represents any additional time required after a production step before the finished good is available, such as holding or curing time. The load offset duration also can be used to specify a production duration—the period of time in which a manufactured order must be actively worked on during a given production method step. If each production step requires a period of days to complete, then the difference in load offset duration from one step to the next is the production duration for that step. Production duration is measured in calendar days, since the load offset duration represents calendar days from load to completion.

If the user uses load offset duration to model production duration, the user may find that representing production duration in calendar days does not meet the user's business needs. A CPP production duration feature alternatively allows the user to measure production duration in manufacturing days, instead of calendar days. With this feature, production duration for a resource represents the number of working days that a given manufactured order needs to spend in production on that resource—days on which the resource must be open. In practice, production duration can stretch around weekends and holidays, as long as the total number of open resource days is respected.

Material Allocation 500

For materials whose supply does not match demand, the material allocation component 500 adjusts existing replenishment plans to make them feasible in terms of material availability. The material allocation component 500 consists of a non-interactive function, constrained material planning (CMP). When using CMP, the user may determine whether the system's objective is to minimize costs or to maximize profitability. The resulting replenishment plans are compatible with the distribution and production components 200 and 400.

CMP also can prevent oversupply—for example, if the demand for end products is too small to consume supplies of an intermediate product that cannot be stored. The system can increase production of the parent SKU by moving future production to an earlier date in order to consume the entire supply of the intermediate.

To use the material allocation component 500, the user should set up the database 600 and specify properties for the material allocation component 500 process. The user first sets the values for each SKU that is to have a material-constrained supply plan. A SKU is an item at a location. Before the user defines a SKU, the user first defines its item and location. When defining the item, the users may specify certain characteristics such as size or quality. The user also defines possible connections between locations for each of the transportation modes. The user also may provide bill of material (BOM) data that defines the relationships between parent SKUs and their subordinates. The user may also define the portion of a destination SKU's replenishments that come from each of its source. The system 100 may use the sourcing data when creating an unconstrained replenishment plan. The material allocation in material/allocation component 500 produces supply plans that are constrained by material availability, based on the user's supply the planning component 210 goal, to minimize costs or maximize profits.

The CMP function in material allocation component 500 produces supply plans that are constrained by material availability. The system can generate a feasible material-constrained supply planning component 210 for each parent or destination SKU whose demand is greater than the projected supply of one or more of its subordinates or sources.

From a source or subordinate where the user does not want to carry inventory, CMP also can try to push inventory out to destinations and parents. It moves planned arrivals and planned orders to earlier periods to consume excess supply.

The user sets the goal of supply planning component 210—either to minimize costs or to maximize profits. The CMP then automatically matches the demand for and availability of critical materials based on a set of constraints that the user configures. If those constraints prevent a feasible plan, the system notifies the user so that the user can relax some of the constraints.

For each selected SKU, the CMP creates a material-constrained supply planning component 210 to satisfy demand within a CMP horizon for the demand/supply tree. The demand/supply tree consists of all the SKUs that are related to the selected SKU through the Bill of Material (BOM) and Sourcing data in database 600. For certain source and subordinate SKUs, the CMP tries to eliminate inventory by moving planned orders for parents and planned arrivals to destinations to earlier periods. The following sections summarize the steps involved in those procedures. When multiple SKUs are competing for the same constrained material, CMP must determine which SKU's demand will be met next.

To select an SKU with independent demand, the CMP first seeks the SKU that maximizes the objective value, based on the current Objective property. The CMP then selects the SKU whose demand falls in the earlier period. The CMP next selects the SKU with the smallest SKU identifier. Overall, the CMP distinguishes among Critical SKUs that have an existing supply that cannot be changed, Constrained SKUs that are parents or destinations of critical SKUs, and Unconstrained SKUs that are not constrained or critical.

When the user opens a CMP process, the system 100 first determines the starting period of the CMP horizon for each SKU in the demand/supply tree based on the information in the database 600. The CMP will search for supply to satisfy demands that fall within the CMP horizon for each parent and destination. It generally assumes there is no supply before the horizon and infinite supply after the horizon. The CMP then performs a series of passes to meet different types of demand. Specifically, the CMP identifies the earliest unsatisfied demand of a particular type, then searches for supply to meet that demand. Supply may come from inventory, production, or sourcing.

If inventory of any SKU is negative because of firm and then dependent demand or distribution demand, the CMP finds supply to bring it up to 0 and then meets minimum required demand resulting from firm planned arrivals, firm planned orders, or scheduled receipts. The CMP also may reallocate supply by time period in order to make the supply planning component 210 more just-in-time (i.e., not supply SKUs too early). The CMP then allocates supply to cover safety stock.

The CMP works one period at a time, for each pass, the CMP determines whether the demand can be met from existing supplies, including firm planned orders and firm planned arrivals. If additional supply is needed and the SKU is not critical, CMP determines whether sources or subordinates can provide additional supply at any time within the CMP horizon. If so, it adjusts existing nonfirm or CMP-firmed planned orders or planned arrivals or creates new ones if none exist. The planned orders and planned arrivals for constrained materials cannot exceed the available supply. When adjusting or creating planned orders, the CMP tries to make as few changes as possible to the quantities and dates in the existing supply plan. For each period, the material allocation component 500 compares planned orders created by CMP to existing nonfirm and CMP-firmed planned orders according to the rules in Table 14.

TABLE 14

| If the planned order created by CMP is... | and New Planned Order/Planned Arrival Rule is ... | Then ... |
|---|---|---|
| greater than the total existing CMP-firmed and nonfirm planned orders in the period | Begin | Increase the quantity of the earliest existing nonfirm planned order |
|  | End | Increase the quantity of the latest existing nonfirm planned order |
| less than the total existing CMP-firmed and nonfirm planned orders in the period | Begin | Decrease the quantity of the latest existing nonfirm planned order(s) |
|  | End | Decrease the quantity of the earliest existing nonfirm planned order(s) |
| Equal to the total existing CMP-firmed and nonfirm planned orders in the period | Begin or End | Make no changes |

When CMP creates a new planned order or planned arrival, the need date is assumed to fall within the period containing the demand. However, if there is no feasible supply in that period, CMP uses the next later period when supply is available. CMP assigns periods to other dates associated with planned orders and planned arrivals, then assigns specific dates. At this point, the CMP may set a time fence for all selected SKUs that are either constrained but not critical, or selected noncritical parents and destinations of SKUs. The CMP determines the period containing the time fence, then sets the time fence date to the last minute in that period.

The CMP next firm all non-firm planned orders and planned arrivals that are inside the CMP Firm Duration. In one embodiment, the CMP tries to consume the SKU's inventory by moving planned arrivals and planned orders for its destinations and parents to earlier periods. To select the next subordinate or source SKU with excess inventory to process, CMP selects subordinates and sources before parents and destinations. If there are multiple SKUs to select from, it may select the one with the smallest SKU identifier. To select the next parent or destination whose planned order or planned arrival will be moved earlier, the CMP generally looks for either the SKU having the earliest order/arrival date or the SKU having the lowest inventory carrying cost of parent or destination.

CMP performs a series of passes, in which it finds supply to meet unmet demand. In one of those passes, CMP reallocates supply by time period in order to make the supply planning component 210 more just-in-time.

Distribution and CPP can use the material-constrained planned orders and planned arrivals as input. The distribution planning component 330 will not delete any firm planned orders. CMP will not delete firm planned orders that were firmed by the user, but it can change firm planned orders firmed by CMP the next time it runs. The user may need to run planning component 210 before or after running CMP.

After running CMP, the user can run CPP to adjust the master production of planning component 210 (within the period covered by the material-constrained supply plan) to meet resource constraints without violating material constraints. By defining the critical materials as resources, the user enable CPP to adjust the master production of planning component 210 without violating the material constraints, resulting in a supply planning component 210 that is simultaneously constrained by both material and resource capacity.

The user also may want to run the planning component 210, then CPP, then CMP. This would be appropriate when CPP produces a master production of planning component 210 in which some subordinate SKUs are critical materials. CMP can then adjust the production of planning component 210 of parent SKUs as necessary to ensure that it is feasible in terms of material availability.

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they develop. It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed:

1. A computer implemented method utilizing code stored in a computer storage medium for fulfilling an order that requests items by a requested date, comprising:

storing supply chain data including information identifying the items by stock-keeping unit (SKU), a physical location for each SKU, a quantity of each SKU at each location, replenishment data for each SKU, a minimum inventory level for each SKU at each location, a storage cost for each SKU at each location, and distribution data for each SKU in a database comprising a computer storage medium provided by a database server;

tracking changes in the supply chain and determining actions to meet requirements of the order given the changes to the supply chain by a computer implemented distribution module provided by a fulfillment server for calculating replenishment requirements by applying leveling logic based on sourcing requirements, generating planned replenishments, adjusting coverage durations, and making adjustments to avoid waste, and for flagging potential issues with planning to replenish inventory;

generating shipments of SKUs and managing distribution and transportation requirements based on the shipments by a computer implemented deployment module provided by the fulfillment server;

managing a production schedule of the SKUs in view of the orders by a computer implemented production module provided by the fulfillment server;

adjusting the distribution module to replenish SKUs in line with material availability by a computer implemented material allocation module provided by the fulfillment server; and producing an output by the fulfillment server comprising a date sensitive replenishment requirement using an expiration date, shelf life duration, coverage cycle, maximum waste factor, and projected unusable on-hand inventory information in generating planned replenishment of inventory, wherein the date sensitive replenishment requirement applies a first effective shelf life for an item of inventory that is one of: a) produced in the winter; or b) being shipped to a geographic location having a cold climate, and a second effective shelf life for an item of inventory that is one of: a) produced in the summer; or b) being shipped to a geographic location having a warm climate, wherein the replenishment requirement determines an inventory level for a physical location that considers for an arrival date an amount of usable inventory at that physical location, wherein the usable inventory is equal to the on-hand inventory less the unusable inventory, wherein the unusable inventory includes SKUs that have exceeded their effective shelf life, wherein the effective shelf life of an SKU is the difference between the shelf life of the SKU and the minimum shelf life of that SKU, and wherein the minimum shelf life of an SKU is the amount of shelf life the SKU must have remaining to be acceptable to a consumer.

2. The computer implemented method of claim 1, further comprising resolving shortages from a source selected from the group consisting of surplus inventory, lowest cost alternative source, and alternative source with lowest restocking cost.

3. The computer implemented method of claim 1, further comprising calculating shortage quantities for a location using the minimum level of inventory of each SKU that needs to be maintained at each location.

4. The computer implemented method of claim 1, further comprising scheduling shipments based on an allocation calendar, shipment calendar, and arrival calendar.

5. The computer implemented method of claim 1, further comprising sorting the order of shipments by location priority, demand priority, ship date, or arrival date.

6. The computer implemented method of claim 1, further comprising using an allocation scheme to distribute available inventory based on demand percentage if insufficient inventory of SKUs exists to meet demand.

7. The computer implemented method of claim 1, further comprising building a load by determining which shipments are placed in the load, establishing when the load is full, limiting how early the shipments can arrive at a destination, and setting priority for adding shipments to a partially filled load.

8. The computer implemented method of claim 7, further comprising calculating the priority for adding shipments to the partially filled load by imposing a penalty for each day that a shipment is pulled forward if added to the load, providing a reward representing benefits from each SKU that is already on the load, imposing a penalty on a shipment that must be split in order to add the shipment to the load, imposing a penalty on a shipment that when added to the load does not fill the load completely, and providing a reward for a shipment which must be shipped.

9. The computer implemented method of claim 1, further comprising managing production loads on resources in the production plan by moving production load to another time period, altering production process, moving production load to another location, and deleting the excess production load.

10. A computer readable storage medium containing computer readable program code usable with a programmable computer processor, comprising:
  computer readable program code which provides for a database containing supply chain data including the items by stock-keeping units (SKU);
  computer readable program code which provides a distribution module for tracking changes in the supply chain in the database and determining actions to meet a date sensitive replenishment requirement of the order given the changes to the supply chain, the distribution module including,
    (a) a planning component for replenishing inventory of SKUs based on orders, arrivals, and forecasts, wherein the planning component uses an expiration date, shelf life duration, coverage cycle, maximum waste factor, and projected unusable on hand inventory information in generating a planned replenishment of inventory,
    wherein the date sensitive replenishment requirement applies a first effective shelf life for an SKU that is one of: a) produced in the winter; or b) being shipped to a geographic location having a cold climate, and a second effective shelf life for an SKU that is one of: a) produced in the summer; or b) being shipped to geographic location having a warm climate,
    (b) a dynamic deployment component for resolving shortages by moving SKUs from a source with a surplus to a destination with a shortage, and
    (c) a scheduling component for releasing the orders of SKUs;
  computer readable program code which provides a deployment module for generating shipments of SKUs and managing distribution and transportation requirements based on the shipments;
  computer readable program code which provides a production module for managing and generating a production schedule of the SKUs in view of the orders and forecasts; and
  computer readable program code which provides a material allocation module for adjusting the distribution module to replenish SKUs in line with material availability, wherein SKUs available for shipment do not include SKUs determined to be unusable, wherein SKUs determined to be unusable include those SKUs that have exceeded their effective shelf life, wherein the effective shelf life of an SKU is equal to the difference between the shelf life of the SKU and the minimum shelf life for the SKU.

11. The computer readable storage medium of claim 10, wherein the production module includes:
  a load leveler component for managing production loads on resources in a production plan; and
  a constrained production planning component for determining a production load offset duration as a time between when the production load is placed on a critical resource and when the order is ready to ship.

12. The computer readable storage medium of claim 10, wherein the production module includes:
  computer readable program code that prorates the forecast;
  computer readable program code that adjusts the forecast;
  computer readable program code that calculates replenishment requirements by applying leveling logic based on sourcing requirements, generating planned replenishments, adjusting coverage durations, and making adjustments to avoid waste; and
  computer readable program code that flags potential issues with planning for replenishing inventory.

13. The computer readable storage medium of claim 10, wherein the deployment module includes:
  a load builder component for placing a plurality of shipments of SKUs into a vehicle load;
  a load manager component for reviewing and revising the vehicle load; and
  a distribution planning component for tracking excess, obsolete, and expiring inventory of SKUs.

14. A computer system for fulfilling orders, comprising:
  means for providing a database containing supply chain data including the items by stock-keeping units (SKU);
  means for providing a distribution module for tracking changes in the supply chain in the database and determining actions to meet requirements of the order given the changes to the supply chain, the distribution module including,
    (a) a planning component for replenishing inventory of SKUs based on orders, arrivals, and forecasts, wherein the planning component calculates replenishment requirements by applying leveling logic based on sourcing requirements, generating planned replenishments, adjusting coverage durations, and making adjustments to avoid waste, and flagging potential issues with planning to replenish inventory,
    (b) a dynamic deployment component for resolving shortages by moving SKUs from sources with a surplus to destinations with shortages, and
    (c) a scheduling component for releasing the orders of SKUs;

means for providing a deployment module for generating shipments of SKUs and managing distribution and transportation requirements based on the shipments;

means for providing a production module for managing a production schedule of the SKUs in view of the orders and forecasts; and means for providing a material allocation module for adjusting the distribution module to replenish SKUs in line with material availability, wherein a date sensitive replenishment requirement is determined using an expiration date, shelf life duration, coverage cycle, maximum waste factor, and projected unusable on hand inventory information, wherein the date sensitive replenishment requirement applies a first effective shelf life for an item of inventory that is one of: a) produced in the winter; or b) being shipped to a geographic location having a cold climate, and a second effective shelf life for an item of inventory that is one of: a) produced in the summer; or b) being shipped to a geographic location having a warm climate, wherein the date sensitive replenishment requirement determines an inventory level for a physical location that considers for an arrival date an amount of usable inventory at that physical location, wherein the usable inventory is equal to the on hand inventory less the unusable inventory, wherein the unusable inventory includes SKUs that have exceeded their effective shelf life, wherein SKUs available for shipment do not include SKUs determined to be unusable, wherein SKUs determined to be unusable include those SKUs that have exceeded their effective shelf life, wherein the effective shelf life of an SKU is equal to the difference between the shelf life of the SKU and the minimum shelf life for the SKU, and wherein the minimum shelf life for an SKU is the amount of shelf life the SKU must have remaining to be acceptable to a consumer.

15. The computer system of claim 14, wherein the planning component includes:
   means for prorating the forecast;
   means for adjusting the forecast;
   means for calculating replenishment requirements by applying leveling logic based on sourcing requirements, generating planned replenishments, adjusting coverage durations, and making adjustments to avoid waste; and
   means for flagging potential issues with planning for replenishing inventory.

16. The computer system of claim 14, wherein the planning component uses expiration date, shelf life duration, coverage cycle, maximum waste factor, and projected unusable on-hand inventory information and applies demand reduction logic in generating planned replenishment of inventory.

17. The computer system of claim 14, wherein the load builder builds a load by determining which shipments are placed in the load, establishing when the load is full, limiting how early the shipments can arrive at a destination, and setting priority for adding shipments to a partially filled load.

18. The computer system of claim 17, wherein the load builder calculates the priority for adding shipments to the partially filled load by imposing a penalty for each day that a shipment is pulled forward if added to the load, providing a reward representing benefits from each SKU that is already on the load, imposing a penalty on a shipment that must be split in order to add the shipment to the load, imposing a penalty on a shipment that when added to the load does not fill the load completely, and providing a reward for a shipment which must be shipped.

* * * * *

UNITED STATES PATENT AND TRADEMARK OFFICE
CERTIFICATE OF CORRECTION

PATENT NO. : 7,668,761 B2  Page 1 of 1
APPLICATION NO. : 09/984349
DATED : February 23, 2010
INVENTOR(S) : Jenkins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2109 days.

Signed and Sealed this

Seventh Day of December, 2010

David J. Kappos
*Director of the United States Patent and Trademark Office*